United States Patent
Kushibe et al.

(10) Patent No.: US 10,831,950 B2
(45) Date of Patent: Nov. 10, 2020

(54) STREAKLINE VISUALIZATION APPARATUS AND METHOD

(71) Applicants: FUJITSU LIMITED, Kawasaki (JP); The University of Tokyo, Tokyo (JP)

(72) Inventors: Daisuke Kushibe, Kawasaki (JP); Masahiro Watanabe, Kawasaki (JP); Toshiaki Hisada, Kashiwa (JP); Seiryo Sugiura, Bunkyo (JP); Takumi Washio, Bunkyo (JP); Jun-ichi Okada, Bunkyo (JP)

(73) Assignees: FUJITSU LIMITED, Kawasaki (JP); THE UNIVERSITY OF TOKYO, Tokyo (JP)

( * ) Notice: Subject to any disclaimer, the term of this patent is extended or adjusted under 35 U.S.C. 154(b) by 436 days.

(21) Appl. No.: 15/827,658

(22) Filed: Nov. 30, 2017

(65) Prior Publication Data
US 2018/0157772 A1  Jun. 7, 2018

(30) Foreign Application Priority Data
Dec. 6, 2016  (JP) .................. 2016-236734

(51) Int. Cl.
*G06F 30/20* (2020.01)
*G06F 17/13* (2006.01)
(Continued)

(52) U.S. Cl.
CPC .............. *G06F 30/20* (2020.01); *G06F 17/13* (2013.01); *G06F 17/16* (2013.01); *G06F 2111/10* (2020.01)

(58) Field of Classification Search
None
See application file for complete search history.

(56) References Cited

U.S. PATENT DOCUMENTS

| 8,744,818 B2 * | 6/2014 | Ueda ...................... G06F 30/00 703/6 |
| 2006/0074610 A1 * | 4/2006 | Rasmussen ............. G06F 30/23 703/2 |

(Continued)

FOREIGN PATENT DOCUMENTS

| JP | 2003-6552 | 1/2003 |
| JP | 2015-97759 | 5/2015 |
| WO | WO 2016/056642 A1 | 4/2016 |

OTHER PUBLICATIONS

Wen, Chih-Yung et al., "Investigation of Pulsatile Flowfield in Healthy Thoracic Aorta Models", Feb. 2010, Annuals of Biomedical Engineering, vol. 38, No. 2. (Year: 2010).*

(Continued)

*Primary Examiner* — Cedric Johnson
(74) *Attorney, Agent, or Firm* — Xsensus LLP

(57) ABSTRACT

A streakline visualization apparatus sets a partial region including a discrete point at a first position on a first streakline in an analysis space as an analysis target region of the discrete point. Based on a velocity of fluid in the analysis target region indicated by fluid information, the apparatus calculates a second position indicating a destination of a particle on the discrete point at a second analysis time point. Next, based on information about a structure in the analysis target region indicated by structure information, the apparatus determines a region occupied by the structure in the analysis target region at the second analysis time point. Next, based on the first and second positions, the apparatus determines whether a second streakline has entered the occupied region. If the second streakline has not entered the occupied region, the apparatus displays the second streakline passing through the second position.

9 Claims, 28 Drawing Sheets

(51) Int. Cl.
*G06F 17/16* (2006.01)
*G06F 111/10* (2020.01)

(56) References Cited

U.S. PATENT DOCUMENTS

2015/0038860 A1* 2/2015 Fonte ............... A61B 5/026
                                              600/505
2015/0120255 A1* 4/2015 King ............... E21B 43/00
                                              703/2

OTHER PUBLICATIONS

Lane, David A., "UFAT—A Particle Tracer for Time-Dependent Flow Fields", 1994, IEEE. (Year: 1994).*
Li, Chao et al., "Application of Topology Analysis in Visualization of 2D Dynamic Vector Fields", 2016, IEEE. (Year: 2016).*
Batycky, Roderick, P., "A Three-Dimensional Two-Phase Field Scale Streamline Simulator", Jan. 1997, Department of Petroleum Engineering, Stanford University. (Year: 1997).*
Tino Weinkauf, et al. "Streak Lines as Tangent Curves of a Derived Vector Field", IEEE Transactions on Visualization and Computer Graphics, vol. 16, Issue 6, 2010, 10 pages.
Erwin Fehlberg "Low-Order Classical Runge-Kutta Formulas With Stepsize Control and Their Application to Some Heat Transfer Problems", NASA Technical Report, NASA TR R-315, 1969, 47 pages.
J. Donea, et al. "Arbitrary Lagrangian-Eulerian methods", Encyclopedia of Computational Mechanics, 2004, 38 pages.
Seiryo Sugiura, et al. "Multi-scale simulations of cardiac electrophysiology and mechanics using the University of Tokyo heart simulator", Progress in Biophysics and Molecular Biology, vol. 110, 2012, 10 pages.
Extended European Search Report dated Apr. 18, 2018 in European Patent Application No. 17202736.9, 10 pages.
Lane, D.A., "UFAT 8 A Particle Tracer for Time-Dependent Flow Fields", IEEE Proceedings of the Visualization Conference, XP000515799, Oct. 17, 1994, pp. 257-264.
Chao, Li, et al., "Application of Topology Analysis in Visualization of 2D Dynamic Vector Fields", $7^{th}$ IEEE International Conference on Software Engineering and Service Science, XP033079954, Aug. 26, 2016, pp. 641-645.
Wen, Chih-Yung, et al., "Investigation of Pulsatile Flowfield in Healthy Thoracic Aorta Models", Annals of Biomedical Engineering, vol. 38 No. 2, XP019765897, Nov. 5, 2009, pp. 391-402.
Extended European Search Report dated Apr. 19, 2018 in Patent Application No. 17203528.9, 10 pages.
Joseph E. Flaherty "Finite Element Analysis—Chapter 4 Finite Element Approximation", 2005, http://www.cs.rpi.edu/~flaherje/pdf/fea4.pdf, 37 pages.
MicroAVS Support Information, Frequently Asked Questions (FAQ), http://www.cybernet.co.jp/avs/support/microavs/faq/, 13 pages (with English Translation).
Sheldon Imaoka "Using New Meshing Features in ANSYS Workbench Simulation", ANSYS Advantage , vol. II, Issue 2, 2008, 3 pages.
U.S. Office Action dated Apr. 16, 2020, issued in corresponding U.S. Appl. No. 15/827,579.

* cited by examiner

FIG. 7

112 GROUP OF FLUID INFORMATION FILES  flui0002.inp
flui0001.inp

112a FLUID INFORMATION FILE

BLOOD FLOW DATA

| GRID ID | x | y | z |
|---|---|---|---|
| 1 | − 4.8734700E−04 | 1.2971100E−02 | 8.2951500E−02 |
| 2 | − 8.4492100E−03 | 6.7902200E−03 | 8.4463100E−02 |
| 3 | − 2.1713100E−03 | 2.6337800E−02 | 5.9221000E−02 |
| ... | ... | ... | ... |
| N | − 8.4582500E−03 | 1.2153300E−02 | 6.4517600E−02 |

| TETRA ID | GRID ID1 | GRID ID2 | GRID ID3 | GRID ID4 |
|---|---|---|---|---|
| 1 | 64088 | 64441 | 37425 | 31062 |
| 2 | 64088 | 64441 | 37425 | 37425 |
| 3 | 64088 | 64441 | 37429 | 37465 |
| . | ... | ... | ... | ... |
| N | 1538 | 9538 | 311 | 2354 |

| TETRA ID | vx | vy | vz |
|---|---|---|---|
| 1 | − 3.3427000E−03 | − 3.8634900E−03 | 1.3479400E−02 |
| 2 | − 8.4085600E−03 | − 4.2889500E−03 | 1.0894800E−02 |
| 3 | − 1.5721000E−03 | − 9.6297300E−05 | 1.4328800E−02 |
| ... | ... | ... | ... |
| N | 0.0000000E+00 | 0.0000000E+00 | 0.0000000E+00 |

TIME POINT $t = t_0$

TIME POINT $t = t_1 = t_0 + \Delta t$

112b FLUID INFORMATION FILE

FIG. 11

TIME POINT $t = t_0$

| | POINT 1 ON LINE (COORDINATES) | POINT 2 ON LINE (COORDINATES) | POINT 3 ON LINE (COORDINATES) | ... | POINT M ON LINE (COORDINATES) |
|---|---|---|---|---|---|
| STREAKLINE $l_1$ | (0.0247,0.0274,0.0644) | (0.0247,0.0274,0.0644) | (0.0247,0.0274,0.0644) | ... | (0.0247,0.0274,0.0644) |
| STREAKLINE $l_2$ | (0.0158,0.0422,0.0112) | (0.0158,0.0422,0.0112) | (0.0158,0.0422,0.0112) | ... | (0.0158,0.0422,0.0112) |
| ... | | | | | |
| STREAKLINE $l_M$ | (0.0163,0.0359,0.0115) | (0.0163,0.0359,0.0115) | (0.0163,0.0359,0.0115) | ... | (0.0163,0.0359,0.0115) |

TIME POINT $t = t_1 = t_0 + \Delta t$

| | POINT 1 ON LINE (COORDINATES) | POINT 2 ON LINE (COORDINATES) | POINT 3 ON LINE (COORDINATES) | ... | POINT M ON LINE (COORDINATES) |
|---|---|---|---|---|---|
| STREAKLINE $l_1$ | (0.0241,0.0290,0.0538) | (0.0247,0.0274,0.0644) | (0.0247,0.0274,0.0644) | ... | (0.0247,0.0274,0.0644) |
| STREAKLINE $l_2$ | (0.0137,0.0404,0.0109) | (0.0158,0.0422,0.0112) | (0.0158,0.0422,0.0112) | ... | (0.0158,0.0422,0.0112) |
| ... | | | | | |
| STREAKLINE $l_M$ | (0.0151,0.0341,0.0115) | (0.0163,0.0359,0.0115) | (0.0163,0.0359,0.0115) | ... | (0.0163,0.0359,0.0115) |

TIME POINT $t = t_2 = t_1 + \Delta t$

| | POINT 1 ON LINE (COORDINATES) | POINT 2 ON LINE (COORDINATES) | POINT 3 ON LINE (COORDINATES) | ... | POINT M ON LINE (COORDINATES) |
|---|---|---|---|---|---|
| STREAKLINE $l_1$ | (0.0224,0.0299,0.0455) | (0.0231,0.0285,0.0455) | (0.0247,0.0274,0.0644) | ... | (0.0247,0.0274,0.0644) |
| STREAKLINE $l_2$ | (0.0115,0.0401,0.0108) | (0.0137,0.0405,0.0110) | (0.0158,0.0422,0.0112) | ... | (0.0158,0.0422,0.0112) |
| ... | | | | | |
| STREAKLINE $l_M$ | (0.0147,0.0326,0.0114) | (0.0149,0.0341,0.0115) | (0.0163,0.0359,0.0115) | ... | (0.0163,0.0359,0.0115) |

...

TIME POINT $t = t_N = t_{N-1} + \Delta t$

| | POINT 1 ON LINE (COORDINATES) | POINT 2 ON LINE (COORDINATES) | POINT 3 ON LINE (COORDINATES) | ... | POINT M ON LINE (COORDINATES) |
|---|---|---|---|---|---|
| STREAKLINE $l_1$ | (0.0235,0.0314,0.0439) | (0.0204,0.0272,0.0501) | (0.0205,0.0269,0.0570) | ... | (0.0247,0.0274,0.0644) |
| STREAKLINE $l_2$ | (0.0100,0.0486,0.099) | (0.0095,0.0482,0.0999) | (0.0879,0.0472,0.1000) | ... | (0.0158,0.0422,0.0112) |
| ... | | | | | |
| STREAKLINE $l_M$ | (0.0171,0.0299,0.0246) | (0.0182,0.0315,0.0248) | (0.0207,0.0341,0.0261) | ... | (0.0163,0.0359,0.0115) |

FIG. 16

TRUTH TABLE

| STATUS VARIABLE | 0 | 1 | 2 | 3 | 4 |
|---|---|---|---|---|---|
| FLUID DETERMINATION | T | F | F | T | T |
| LINE DETERMINATION | F | T | F | T | T |
| NUMBER OF INTERSECTIONS | 0 | $\neq 0$ | 0 | $\geq 2$ | 1 | ns
STREAKLINE VISUALIZATION APPARATUS AND METHOD

CROSS-REFERENCE TO RELATED APPLICATION

This application is based upon and claims the benefit of priority of the prior Japanese Patent Application No. 2016-236734, filed on Dec. 6, 2016, the entire contents of which are incorporated herein by reference.

FIELD

The embodiments discussed herein relate to a streakline visualization apparatus and method.

BACKGROUND

Fluid mechanics is one of the academic fields in mechanics and describes behavior of fluid. Fluid mechanics has been applied to various industrial fields where not only flow of air or water but also transfer of a physical quantity such as the temperature or concentration is handled as a problem. For example, fluid mechanics has been applied to wind tunnel experiments to evaluate prototypes of automobiles, and aerodynamic characteristics of these automobiles have been optimized on the basis of the experiment results. However, these wind tunnel experiments are very costly. Thus, in place of wind tunnel experiments, computer simulations (fluid simulations), which simulate wind tunnel experiments, have been conducted by using computational fluid mechanics.

Recent improvement in computer performance has made rapid progress in fluid simulations. As a result, fluid simulations have been applied not only to evaluation of aerodynamic characteristics of aircraft, automobiles, railroad vehicles, ships, etc., but also to analysis of blood flow states of hearts, blood vessels, etc.

When a fluid simulation is conducted, an analysis result is visualized so that the analysis result may easily be understood visually. One means of visualizing a result of a fluid simulation is displaying streaklines. A streakline is a curve formed by connecting fluid particles that have passed through a certain point in space. In a wind tunnel experiment, a trail of smoke ejected from a predetermined place is a streakline. Namely, by calculating a streakline in a fluid simulation and displaying the streakline, the motion of particles in fluid, as in a trail of smoke in a wind tunnel experiment, is visualized, without performing any wind tunnel experiment.

Various techniques relating to fluid simulations have been proposed. For example, there has been proposed a technique of performing a high-speed simulation and quickly and smoothly representing a scene in fluid in detail. There has also been proposed a technique of easily applying a result of a structure-fluid analysis simulation to diagnosis of vascular abnormality. There has also been proposed an apparatus that enables users such as doctors who are unfamiliar with computational fluid mechanics to conduct appropriate blood flow simulations. In addition, various papers relating to fluid simulations have been published. See, for example, the following literatures:

Japanese Laid-open Patent Publication No. 2003-6552
Japanese Laid-open Patent Publication No. 2015-97759
International Publication Pamphlet No. WO2016/056642
Tino Weinkauf and Holger Theisel, "Streak Lines as Tangent Curves of a Derived Vector Field", IEEE Transactions on Visualization and Computer Graphics, Volume: 16, Issue: 6, November-December 2010
Erwin Fehlberg, "LOW-ORDER CLASSICAL RUNGE-KUTTA FORMULAS WITH STEPSIZE CONTROL AND THEIR APPLICATION TO SOME HEAT TRANSFER PROBLEMS", NASA TECHNICAL REPORT, NASA TR R-315, JULY 1969
J. Donea, A. Huerta, J.-Ph. Ponthot and A. Rodriguez-Ferran, "Arbitrary Lagrangian-Eulerian methods", Encyclopedia of Computational Mechanics, John Wiley & Sons Ltd., November 2004, pp. 413-437
Seiryo Sugiura, Takumi Washio, Asuka Hatano, Junichi Okada, Hiroshi Watanabe, Toshiaki Hisada, "Multi-scale simulations of cardiac electrophysiology and mechanics using the University of Tokyo heart simulator", Progress in Biophysics and Molecular Biology, Volume 110, October-November 2012, Pages 380-389

However, these conventional streakline analysis techniques are based on the assumption that the structure in the analysis space does not deform, as in the case of analysis of the flow of air around an automobile, for example. When the structure deforms, it is difficult to track a streakline accurately.

SUMMARY

According to one aspect, there is provided a streakline visualization apparatus, that calculates a streakline indicating a series of a plurality of particles at a plurality of analysis time points in fluid simulation time and displays the streakline, the streakline visualization apparatus including: a memory configured to hold structure information indicating temporal change of a shape of a structure in an analysis space and fluid information indicating at least one of spatial change and temporal change of a velocity of fluid at a plurality of points in a region where the fluid exists in the analysis space; and a processor coupled to the memory and configured to perform a procedure including: setting, when calculating a second streakline at a second analysis time point based on a first streakline at a first analysis time point, a partial region including a discrete point at a first position on the first streakline in the analysis space as an analysis target region of the discrete point, calculating, based on the velocity of the fluid in the analysis target region, the velocity indicated by the fluid information, a second position indicating a destination of a particle on the discrete point at the second analysis time point, determining, based on information about the structure in the analysis target region, the information indicated by the structure information, a region occupied by the structure in the analysis target region at the second analysis time point, determining entrance or non-entrance of the second streakline into the occupied region based on the first position and the second position, and displaying, when determining that the second streakline has not entered the occupied region, the second streakline passing through the second position.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 7 illustrates an example of a group of fluid information files;

FIG. 11 illustrates data examples of streaklines;

FIG. 16 is a truth table indicating status variables;

DESCRIPTION OF EMBODIMENTS

Figure 1:
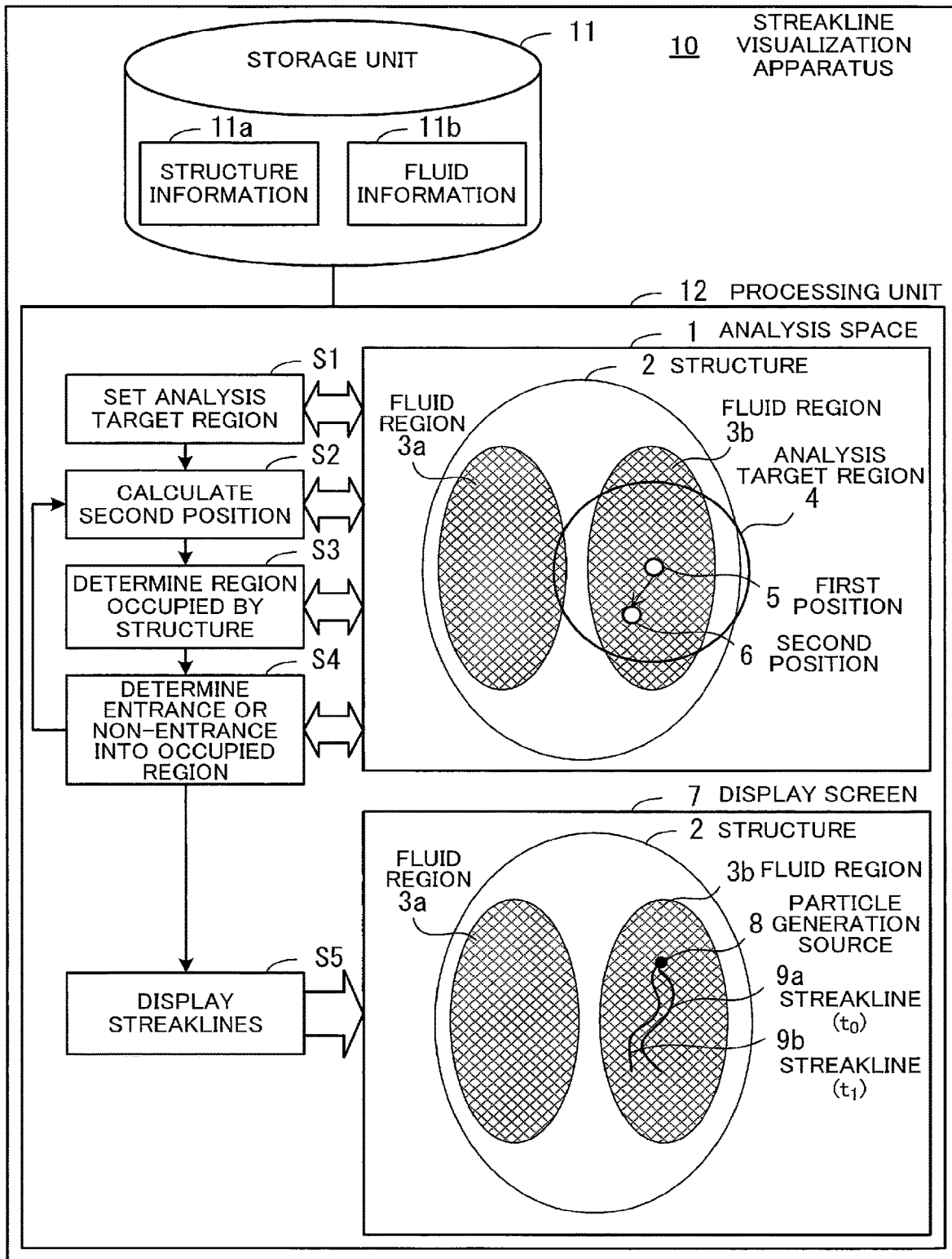
FIG. 1 illustrates a configuration example of a streakline visualization apparatus according to a first embodiment.

Embodiments will be described below with reference to the accompanying drawings, wherein like reference characters refer to like elements throughout. Two or more of the embodiments may be combined with each other without causing inconsistency.

First Embodiment

First, a first embodiment will be described. The first embodiment provides a streakline display apparatus capable of tracking streaklines even when a structure deforms.

FIG. 1 illustrates a configuration example of a streakline visualization apparatus according to a first embodiment. This streakline visualization apparatus 10 calculates a streakline indicating a series of a plurality of particles at a plurality of analysis time points in fluid simulation time and displays the streakline. For example, the streakline visualization apparatus 10 is a computer including a processor as an arithmetic processing device and a memory as a main storage device. The streakline visualization apparatus 10 includes a storage unit 11 and a processing unit 12.

The storage unit 11 holds structure information 11a and fluid information 11b. For example, the storage unit 11 is a memory or a storage device of the streakline visualization apparatus 10.

The structure information 11a indicates temporal change of a shape of a structure 2 in an analysis space 1. The fluid information 11b indicates temporal change of a velocity of fluid at a plurality of points in a region (fluid region 3a, 3b) where the fluid exists in the analysis space 1. While the fluid regions 3a and 3b are separately illustrated in FIG. 1, the fluid region 3a and the fluid region 3b may be connected to each other somewhere not illustrated. There are cases in which the right and left hearts are connected to each other, such as congenital heart disease. The structure 2 is a heart, for example. In this case, the fluid is the blood in the heart. When the structure 2 is a heart, the structure information 11a and the fluid information 11b are generated by a simulation in which interaction analysis of pulsation of the heart and coronary circulation of the blood is performed, for example.

The processing unit 12 calculates streaklines based on the structure information 11a and the fluid information 11b stored in the storage unit 11 and displays the calculated streaklines. For example, the processing unit 12 is a processor of the streakline visualization apparatus 10.

When the processing unit 12 calculates a streakline 9b (a second streakline) at a second analysis time point ($t_1$) based on a streakline 9a (a first streakline) at a first analysis time point ($t_0$) in streakline visualization processing, the processing unit 12 performs the following processing.

The processing unit 12 sets a partial region including a discrete point at a first position 5 on the streakline 9a at the first analysis time point ($t_0$) in the analysis space 1 as an analysis target region 4 of the discrete point (step S1). The analysis target region 4 is, for example, a spherical region having the first position 5 at its center. In this case, for example, the processing unit 12 calculates a maximum velocity of the fluid in the time period between the first analysis time point ($t_0$) and the second analysis time point ($t_1$) and calculates the radius of the analysis target region 4 based on the difference between the first analysis time point ($t_0$) and the second analysis time point ($t_1$) and the maximum velocity. The difference between the first analysis time point ($t_0$) and the second analysis time point ($t_1$) is a time step used in the streakline calculation.

Next, the processing unit 12 calculates, based on the velocity of the fluid in the analysis target region 4, the velocity indicated by the fluid information, a second position 6 indicating the destination of a particle on the discrete point at the second analysis time point ($t_1$) (step S2). More specifically, the second position 6 indicates where a virtual particle that has existed at the discrete point at the first analysis time point ($t_0$) exists at the second analysis time point ($t_1$) after carried by the fluid.

Next, the processing unit 12 determines, based on information about the structure 2 in the analysis target region 4, the information indicated by the structure information, a region occupied by the structure 2 in the analysis target region 4 at the second analysis time point ($t_1$) (step S3).

Next, the processing unit 12 determines entrance or non-entrance of the streakline 9b into the occupied region at the second analysis time point ($t_1$) based on the first position 5 and the second position 6 (step S4). For example, the processing unit 12 performs a first determination of whether the second position 6 has fallen inside the fluid and a second determination of whether a line connecting the first position 5 and the second position 6 has crossed a surface of the structure 2. Next, the processing unit 12 determines whether the streakline 9b has entered the occupied region based on results of the first determination and the second determination. For example, when the second position 6 has fallen inside the fluid and when the line has not crossed a surface of the structure 2, the processing unit 12 determines that the streakline 9b has not entered the occupied region.

Even when the second position 6 has fallen inside the fluid, if the line has crossed a surface of the structure 2, processing unit 12 determines that the streakline 9b has entered the occupied region. For example, in the example in FIG. 1, assuming that the second position 6 has fallen inside the fluid region 3a, while the second position 6 exists inside the fluid, the streakline has crossed an element of the structure 2 that exists between the fluid region 3b and the fluid region 3a. Thus, in this case, the processing unit 12 determines that the streakline 9b has entered the occupied region of the structure 2.

In addition, when the second position 6 has fallen outside the fluid and when the line has not crossed a surface of the structure 2, the processing unit 12 determines that the streakline 9b has not entered the occupied region. However, in this case, since the streakline 9b has fallen outside the fluid, the processing unit 12 ends the calculation without displaying the streakline 9b.

When the processing unit 12 determines that the discrete point has not entered the occupied region, the processing unit 12 displays the streakline 9b passing through the second position 6 (step S5). In the example in FIG. 1, the streakline 9a at the first analysis time point ($t_0$) and the streakline 9b at the second analysis time point ($t_1$), which are generated from the particle generation source 8, are superimposed on a cross section of the structure 2 on a display screen 7.

When the processing unit 12 determines that the discrete point has entered the occupied region, the processing unit 12 sets at least one third analysis time point in the time period between the first analysis time point ($t_0$) and the second analysis time point ($t_1$) and calculates a third position indicating the destination of the particle on the discrete point at the third analysis time point. Next, the processing unit 12 recalculates the second position 6 based on the third position. When the processing unit 12 determines that the discrete point has not entered the occupied region as a result of the recalculation, the processing unit 12 displays the streaklines 9a and 9b.

By calculating and displaying streaklines as described above for an individual analysis time point within a predetermined time, the streaklines 9a and 9b of the fluid around the structure 2 whose shape changes over time are accurately displayed on the display screen 7. Namely, the streakline visualization apparatus 10 less frequently displays erroneous streaklines, such as streaklines having entered the structure 2, which changes over time. In other words, the streakline visualization apparatus 10 displays accurate streaklines.

In addition, the structure information 11a and the fluid information 11b to be analyzed when streaklines are calculated corresponds to information in the analysis target region 4. Thus, the processing unit 12 is able to perform its processing efficiently. Being able to calculate streaklines so efficiently, the streakline visualization apparatus 10 is able to perform calculation in view of change of the shape of the structure 2. In addition, the streakline visualization apparatus 10 easily visualize streaklines of the fluid around the structure 2 whose shape changes over time.

When setting the analysis target region 4, the processing unit 12 may set a minimum value as the radius of the analysis target region 4 based on an interval between a plurality of points at which fluid velocities are indicated in a region where the fluid exists, for example. In this case, when the calculated radius is smaller than the minimum value, the processing unit 12 sets the minimum value as the radius of the analysis target region 4. For example, the processing unit 12 may set the maximum interval value between two neighboring points among a plurality of points to the minimum value as the radius of the analysis target region 4. If the radius of the analysis target region 4 is set excessively small, the information about the velocity of the fluid in the analysis target region 4, the information used for the calculation of the second position 6, could not be obtained. However, in the above way, such a circumstance occurs less frequently.

The processing unit 12 may allow a case in which the radius of the analysis target region 4 is smaller than a value calculated by multiplying the difference between the first analysis time point ($t_0$) and the second analysis time point ($t_1$) by the maximum velocity of the fluid in the time period between the first analysis time point ($t_0$) and the second analysis time point ($t_1$). The multiplication result is the moving distance (maximum moving distance) of the discrete point that exists at a position corresponding to the maximum velocity in the fluid. The maximum moving distance may be used as the maximum radius value of the analysis target region 4. For example, the processing unit 12 sets the minimum radius value of the analysis target region 4 to be smaller than the maximum moving distance. In this case, the destination of the particle on the discrete point could fall outside the analysis target region 4. Thus, when the destination of the particle on the discrete point has fallen outside the analysis target region 4 as a result of the calculation of the second position 6, the processing unit 12 recalculates the second position 6 by expanding the analysis target region 4. For example, the processing unit 12 recalculates the analysis target region 4 as a spherical region having a radius corresponding to the maximum moving distance.

As described above, since the processing unit 12 allows a case where the radius of the analysis target region 4 is smaller than the maximum moving distance of the discrete point, the radius of the analysis target region 4 is decreased. Since the amount of information to be analyzed decreases as the radius of the analysis target region 4 decreases, the processing efficiency improves. However, if the calculation of the second position 6 in the analysis target region 4 having the determined radius fails, the processing unit 12 needs to perform the calculation again by setting the radius of the analysis target region 4 to the maximum value (maximum moving distance), which is extra processing. Thus, the processing unit 12 may calculate a radius that minimizes a calculation amount including a calculation amount for the recalculation of the second position 6 until the calculation fails. When the calculated radius is smaller than the minimum value, the processing unit 12 may set the minimum value as the radius of the analysis target region 4. In this case, for example, the processing unit 12 sets a radius achieving the highest processing efficiency based on the probability that the destination of the particle on the discrete point falls outside the analysis target region 4. Namely, the processing unit 12 sets the radius of the analysis target region 4 so that the smallest processing amount is achieved, based on the amount of processing increased when the destination of the particle on the discrete point falls outside the analysis target region 4 and the amount of processing decreased when a smaller radius is set for the analysis target region 4. In this way, the processing efficiency improves.

In addition, since the radius of the analysis target region 4 is decreased, a case where the minimum radius value of the analysis target region 4 is limited by a low-quality mesh, i.e., the quality of a finite element model, occurs less frequently. As a result, increase of the calculation amount by presence of a low-quality mesh occurs less frequently.

In the above description, both the first determination and the second determination are performed as an example of determining whether the streakline 9b has entered the occupied region. However, simply, only the second determination may be performed. Namely, by performing only the second determination of determining whether the line connecting the first position 5 and the second position 6 has crossed a surface of the structure 2, the processing unit 12 is able to determine whether the streakline 9b has entered the occupied region of the structure 2. In this case, if the line has crossed a surface of the structure 2 at least once, the processing unit 12 determines that the streakline 9b has entered the occupied region of the structure 2. For example, when the fluid regions 3a and 3b are enclosed regions and when there are no outlets through which the fluid flows out such as heart arteries, the processing unit 12 is able to accurately determine whether the streakline 9b has entered the occupied region by performing only the second determination.

Second Embodiment

Next, a second embodiment will be described. The second embodiment provides a visualization apparatus capable of visualizing streaklines of the blood flow in a heart along with the motion of the heart.

For example, use of computational fluid analysis makes it possible to simulate the behavior of fluid, even fluid in a system in which measurement is technically or ethically difficult, such as transfer of the blood flow in a heart. Thus, computational fluid analysis is used to discuss treatments of congenital heart disease, etc. in which transfer of the blood flow in a heart malfunctions. Namely, computational fluid analysis is an important technique. By using a visualization apparatus to visualize results of such computational fluid analysis, health-care professionals such as doctors are able to easily understand the analysis results and make treatment plans.

Figure 2:
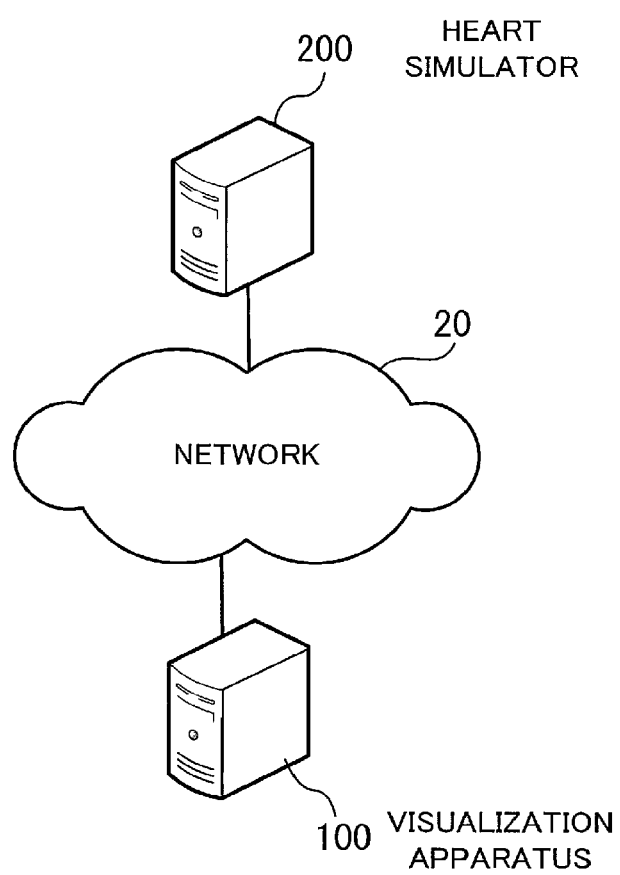
FIG. 2 illustrates a system configuration example according to a second embodiment.

FIG. 2 illustrates a system configuration example according to the second embodiment. A visualization apparatus 100 is connected to a heart simulator 200 via a network 20. The heart simulator 200 is a computer that performs a simulation of the myocardial motion and coronary circulation. The visualization apparatus 100 acquires a simulation result from the heart simulator 200. Next, the visualization apparatus 100 calculates streaklines based on the simulation result and displays the calculated streaklines. For example, the simulation result includes information about a three-dimensional (3D) model indicating a heart shape, the velocity of blood in a blood vessel, and a physical property value of myocardium or blood per time point.

Figure 3:
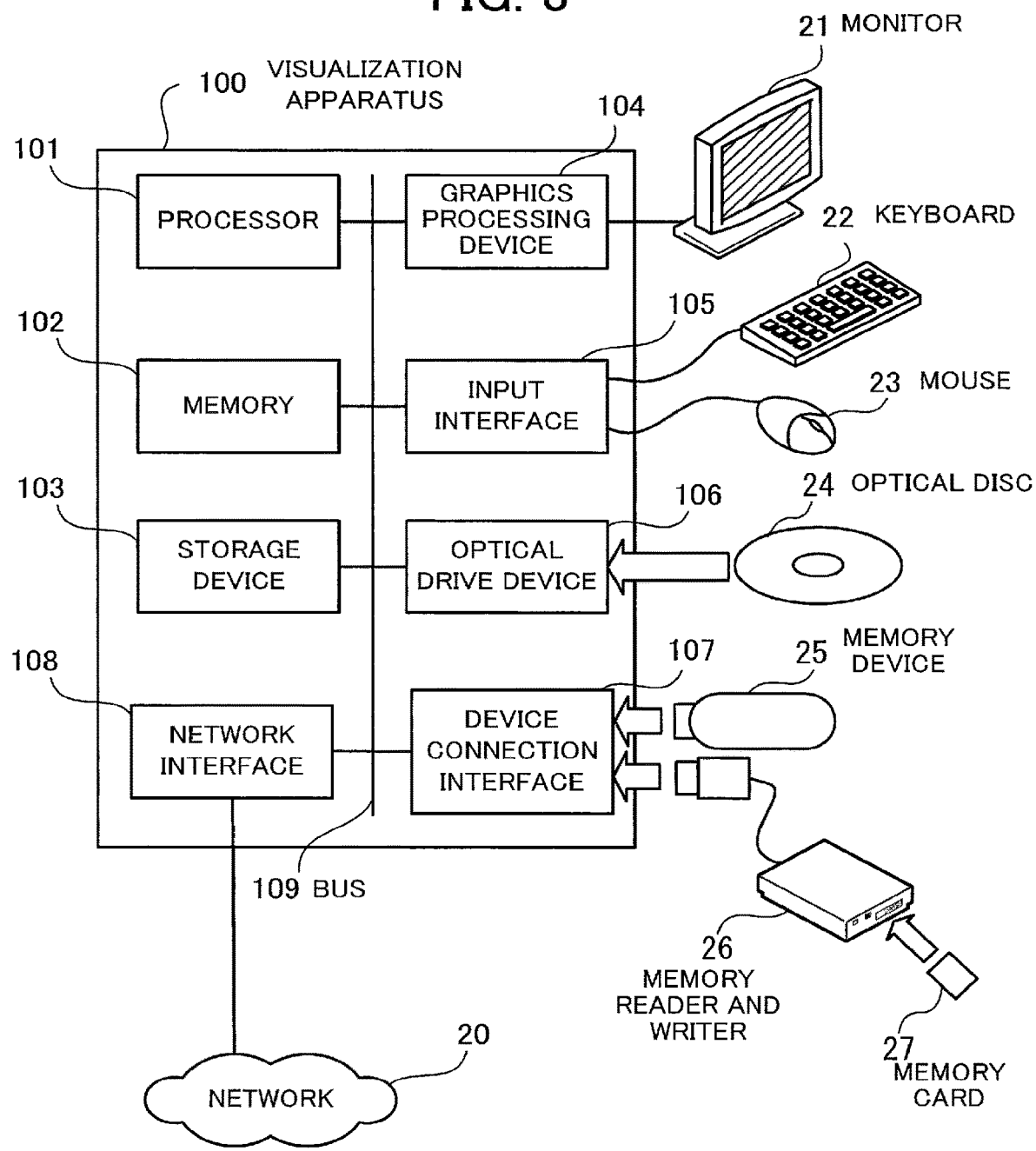
FIG. 3 illustrates a hardware configuration example of a visualization apparatus.

FIG. 3 illustrates a hardware configuration example of the visualization apparatus 100. The visualization apparatus 100 is comprehensively controlled by a processor 101. The processor 101 is connected to a memory 102 and a plurality of peripheral devices via a bus 109. The processor 101 may be a multiprocessor. The processor 101 is an arithmetic processing device such as a central processing unit (CPU), a micro processing unit (MPU), or a digital signal processor (DSP). At least a part of the functions realized by causing the processor 101 to perform a program may be realized by using an electronic circuit such as an application specific integrated circuit (ASIC) or a programmable logic device (PLD).

The memory 102 is used as a main storage device of the visualization apparatus 100. The memory 102 temporarily holds at least a part of an operating system (OS) program or an application program executed by the processor 101. In addition, the memory 102 holds various kinds of data needed for processing performed by the processor 101. For example, a volatile semiconductor storage device such as a random access memory (RAM) is used as the memory 102.

Examples of the peripheral devices connected to the bus 109 include a storage device 103, a graphics processing device 104, an input interface 105, an optical drive device 106, a device connection interface 107, and a network interface 108.

The storage device 103 electrically or magnetically writes and reads data on its storage medium. The storage device 103 is used as an auxiliary storage device of the visualization apparatus 100. The storage device 103 holds an OS program, an application program, and various kinds of data. For example, a hard disk drive (HDD) or a solid state drive (SSD) may be used as the storage device 103.

The graphics processing device 104 is connected to a monitor 21. The graphics processing device 104 displays an image on a screen of the monitor 21 in accordance with an instruction from the processor 101. Examples of the monitor 21 include a cathode ray tube (CRT) display device and a liquid crystal display (LCD) device.

The input interface 105 is connected to a keyboard 22 and a mouse 23. The input interface 105 transmits a signal transmitted from the keyboard 22 or the mouse 23 to the processor 101. The mouse 23 is a pointing device. A different pointing device such as a touch panel, a tablet, a touchpad, or a trackball may also be used.

The optical drive device 106 reads data stored on an optical disc 24 by using laser light or the like. The optical disc 24 is a portable storage medium holding data that is read by light reflection. Examples of the optical disc 24 include a digital versatile disc (DVD), a DVD-RAM, a compact disc read only memory (CD-ROM), and a CD-Recordable (R)/ReWritable (RW).

The device connection interface 107 is a communication interface for connecting peripheral devices to the visualization apparatus 100. For example, a memory device 25 or a memory reader and writer 26 may be connected to the device connection interface 107. The memory device 25 is a storage medium capable of communicating with the device connection interface 107. The memory reader and writer 26 is capable of reading and writing data on a memory card 27. The memory card 27 is a card-type storage medium.

The network interface 108 is connected to the network 20. The network interface 108 exchanges data with other computers or communication devices via the network 20.

The processing functions according to the second embodiment may be realized by the above hardware configuration. The apparatus described in the first embodiment may also be realized by a hardware configuration equivalent to that of the visualization apparatus 100 illustrated in FIG. 3.

The visualization apparatus 100 realizes the processing functions according to the second embodiment by executing a program stored in a computer-readable storage medium, for example. The program holding the processing contents executed by the visualization apparatus 100 may be stored in any one of various kinds of storage media. For example, the program executed by the visualization apparatus 100 may be stored in the storage device 103. The processor 101 loads at least a part of the program in the storage device 103 onto the memory 102 and executes the loaded program. The program executed by the visualization apparatus 100 may be stored in a portable storage medium such as the optical disc 24, the memory device 25, or the memory card 27. For example, after the program stored in the portable storage medium is installed by the processor 101 in the storage device 103, the program is executed by the processor 101. The processor 101 may directly read the program from the portable storage medium and execute the read program.

Next, streaklines will be described.

Figure 4:
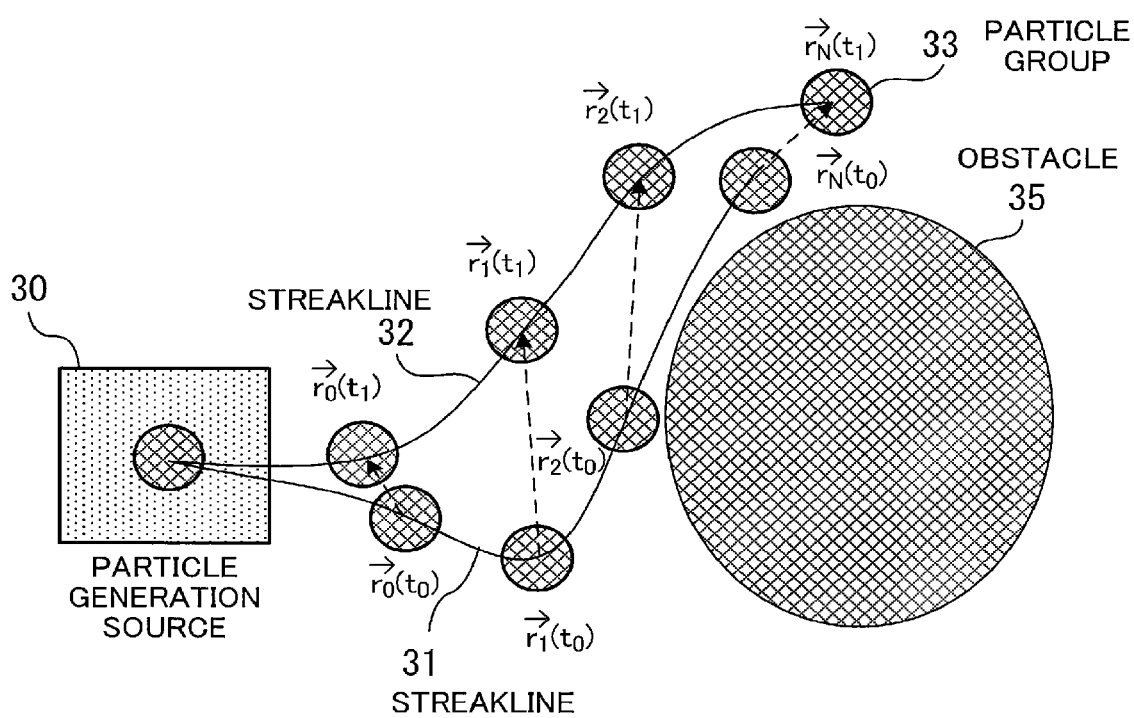
FIG. 4 illustrates a streakline calculation example.

FIG. 4 illustrates a streakline calculation example. The visualization apparatus 100 defines a particle generation source 30 in an analysis target space. When analysis is started, particle groups 33 are continuously emitted from the particle generation source 30. When the flow field does not change over time, the particle groups 33 form a fixed curve (a streamline). However, when the flow field changes over time, the curve formed by the particle groups 33 changes momentarily. Streaklines 31 and 32 are such curves that are formed when the flow field changes over time. In FIG. 4, the streakline 31 represents a series of particle groups 33 at the time point $t_0$, and the streakline 32 represents the series of particle groups 33 at the time point $t_1$. Since there is an obstacle 35, these streaklines 31 and 32 become very curvy.

These streaklines 31 and 32 are useful to visualize how the particle groups 33 are transferred in the time-varying flow field. For example, a case in which the obstacle 35 is an automobile will be described. To visualize the air resistance of a developed automobile, the particle generation source 30 is arranged in front of the automobile, and air is supplied toward the automobile from a fan or the like arranged where the particle generation source 30 is arranged. In addition, in a fluid simulation in the visualization apparatus 100, particle groups 33 are continuously emitted, and trajectories of the particle groups 33 are measured as the streaklines 31 and 32. The streaklines 31 and 32 directly describe and visualize transfer of the fluid. Thus, streaklines are applicable to various fields.

A lot of research has been done on calculation and visualization of streaklines. In addition, a lot of research directed to turbulent flow, unstable flow, etc. has also been done. However, not much research has previously been done on visualization of streaklines in a simulation where an elastic body such as a heart, which is deemed as a wall surface by fluid, undergoes large deformation. Since hearts periodically pulsate and repeatedly expand and contract, they are a typical example of a system that undergoes large deformation. In addition, since this periodic motion plays an important role in the pumping action of the heart, evaluating transfer of the blood flow in the system in which the elastic body periodically undergoes large deformation is important in considering treatments of heart disease.

In the field of biological simulations, heart behaviors have been simulated on computers. Through a simulation on a computer, effectiveness of treatment obtained by an operation is evaluated without actually performing the operation. Thus, use of biological simulations enables doctors to consider the best treatment plans before actually performing an operation. In particular, a heart simulation is directed to a heart having a complex 3D structure, and the behavior of the heart dynamically changes. If streaklines representing transfer of the blood flow in the heart are visualized in coordination with the behavior of the heart, doctors may easily understand the state of the heart visually. Displaying the state of the heart visually easily is effective in preventing errors in judgement.

The following points are obstacles to be overcome to visualize streaklines in the blood flow in a heart.

1. When the myocardium (elastic body) largely deforms, it is difficult to accurately track the behaviors of pathlines and streaklines around the myocardium.

2. In the case of a pathline, calculation needs to be performed only at a single point. However, in the case of a streakline, calculation needs to be performed at all the N points that form the line, resulting in a significantly large amount of calculation.

3. Some low-quality meshes of a finite element model increases the overall calculation amount.

Thus, by using the following functions, the visualization apparatus 100 according to the second embodiment visualizes accurate streaklines with a feasible calculation amount.

1-1: The visualization apparatus 100 accurately determines whether an individual point on a streakline has entered the myocardium outside the moving region or has fallen outside the simulation target system.

1-2: When the visualization apparatus 100 determines that a point on a streakline has fallen outside the moving region, the visualization apparatus 100 adjusts the time step, which is a parameter in a differential equation for a streakline, to prevent the point from falling outside the moving region.

1-3: To estimate information about a field at any time point, the visualization apparatus 100 interpolates the field by using an interpolation method.

2-1: Since application of the function in 1-3 increases the calculation amount, the visualization apparatus 100 evaluates the maximum distance that a point on a streakline moves and evaluates only the information about the field inside a predicted sphere having a radius equal to the maximum distance. In this way, the visualization apparatus 100 maintains a certain calculation amount regardless of the data capacity.

2-2: By dividing the time step, the visualization apparatus 100 decreases the radius of the predicted sphere, needs a calculation amount less than that needed when no predicted sphere is used, and improves the accuracy at the same time.

3-1: Since most of the calculation is performed on high-quality meshes, the visualization apparatus 100 performs speculative calculation by assuming that all the meshes are high-quality meshes. In a case where the calculation fails, the visualization apparatus 100 performs accurate calculation. In this way, the calculation amount is reduced. In this speculative calculation, by allowing the possibility that the destination of a point on a streakline falls outside the predicted sphere, the visualization apparatus 100 decreases the radius of the predicted sphere. The case where the calculation fails is a case where the destination of a point on a streakline does not exist within the predicted sphere.

3-2: Since the visualization apparatus 100 performs speculative calculation in 3-1, the visualization apparatus 100 prepares a probability model and determines a parameter set that achieves the minimum calculation amount including a penalty needed when the calculation fails.

The following advantageous effects are obtained by implementing these functions on the visualization apparatus 100.

1. Even when the myocardium (elastic body) largely deforms, the visualization apparatus 100 is able to calculate streaklines while taking the motion of the myocardium (elastic body) into consideration.

2. The visualization apparatus 100 is able to calculate an individual point on a streakline quickly and accurately by using a predicted sphere.

3. The visualization apparatus 100 is able to set the radius of the predicted sphere that minimizes the calculation cost by using a probability model.

Hereinafter, functions of the visualization apparatus 100 will be described in detail.

Figure 5:
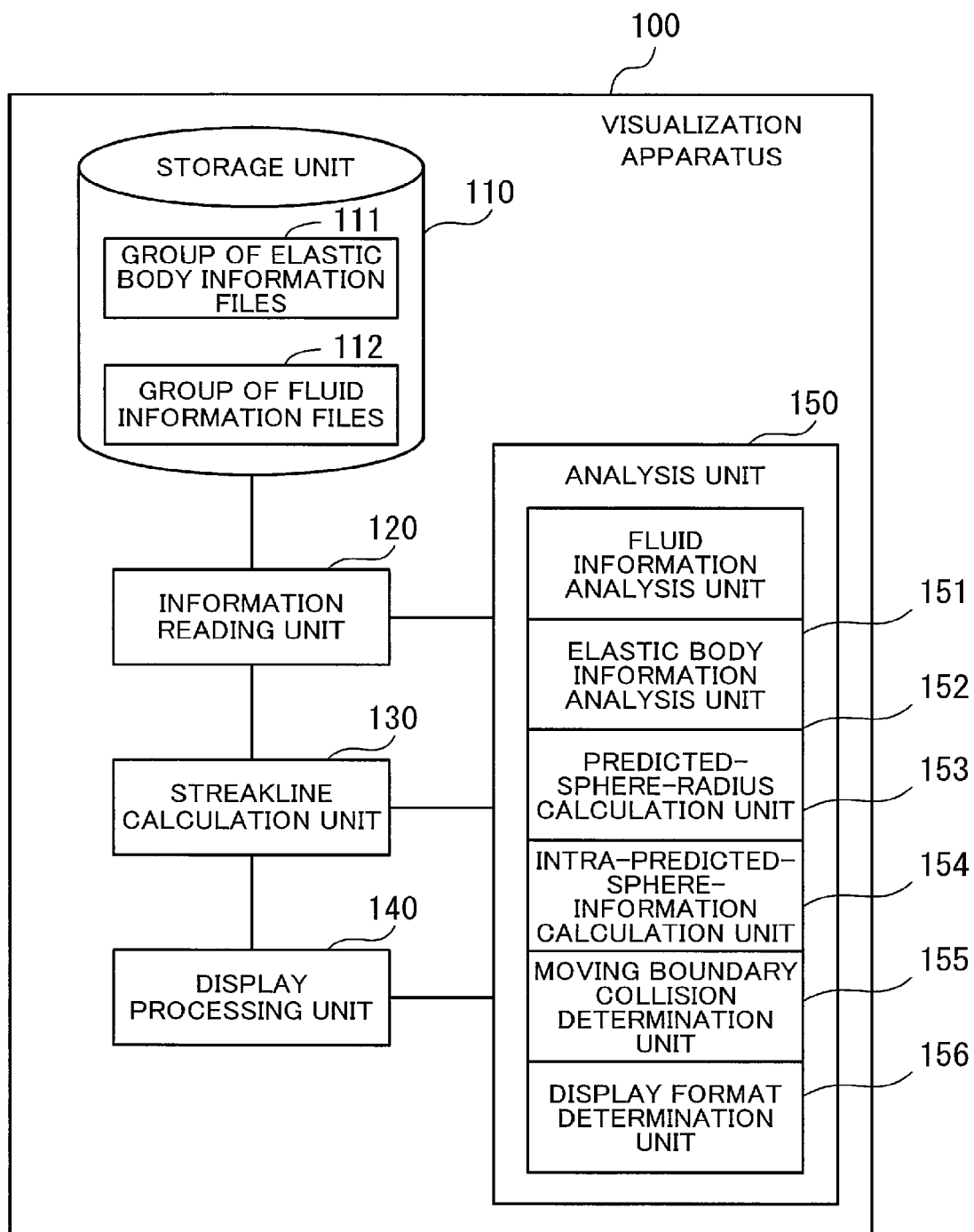
FIG. 5 is a block diagram illustrating functions of the visualization apparatus.

FIG. 5 is a block diagram illustrating functions of the visualization apparatus 100. The visualization apparatus 100 includes a storage unit 110, which holds simulation results acquired from the heart simulator 200. For example, when the heart simulator 200 performs a computational fluid dynamics simulation, simulation results about the dynamically-changing elastic body and fluid fields at L time points $t_0, t_1, \ldots, t_L$ (L is an integer of 1 or more) are stored in files. For example, information about the myocardium and information about the blood flow are stored as separate files in the storage unit 110. In the example in FIG. 5, information about the myocardium per time point is stored as a group of elastic body information files 111, and information about the blood flow per time point is stored as a group of fluid information files 112.

By analyzing these simulation results, the visualization apparatus 100 calculates streaklines that describe information about the transfer of the blood flow. A time interval $\Delta t_i = t_{i+1} - t_i$ outputted as a simulation result does not need to match the time interval used when the heart simulator 200 solves a differential equation. To reduce the information amount, it is common to output only some of the simulation results. Thus, to accurately obtain streaklines, the visualization apparatus 100 uses an interpolation method or the like and estimates various physical quantities at target time points by using output files at a plurality of time points.

Next, processing functions of the visualization apparatus 100 will be described. The visualization apparatus 100 includes an information reading unit 120, a streakline calculation unit 130, a display processing unit 140, and an analysis unit 150.

The information reading unit 120 reads files indicating fluid analysis results from the storage unit 110. The streakline calculation unit 130 calculates streaklines by using the read information. The display processing unit 140 visualizes the obtained results.

The analysis unit 150 is a group of functions commonly used by the information reading unit 120, the streakline calculation unit 130, and the display processing unit 140. When performing specific analysis processing, the information reading unit 120, the streakline calculation unit 130, and the display processing unit 140 request the analysis unit 150 to perform processing and obtain results.

The analysis unit 150 includes a fluid information analysis unit 151, an elastic body information analysis unit 152, a predicted-sphere-radius calculation unit 153, an intra-predicted-sphere-information calculation unit 154, a moving boundary collision determination unit 155, and a display format determination unit 156. The fluid information analysis unit 151 analyzes the velocity field of the fluid, the positions of the discrete points, and the boundary surfaces. The elastic body information analysis unit 152 analyzes the positions of the discrete points of an elastic body such as the myocardium, which is not the fluid, and the boundary surfaces. The predicted-sphere-radius calculation unit 153 sets the radius of the predicted sphere used to improve the calculation speed and the calculation accuracy when streaklines are calculated. The intra-predicted-sphere-information calculation unit 154 calculates the velocity field and the myocardial position inside the predicted sphere, for example. The moving boundary collision determination unit 155 determines whether a point on a streakline has entered the myocardium as a result of a calculation error. The display format determination unit 156 determines how the obtained streaklines are displayed.

For example, the function of an individual element illustrated in FIG. 5 may be realized by causing a computer to perform a program module corresponding to the corresponding element.

Next, information obtained as simulation results will be described in detail.

Figure 6:
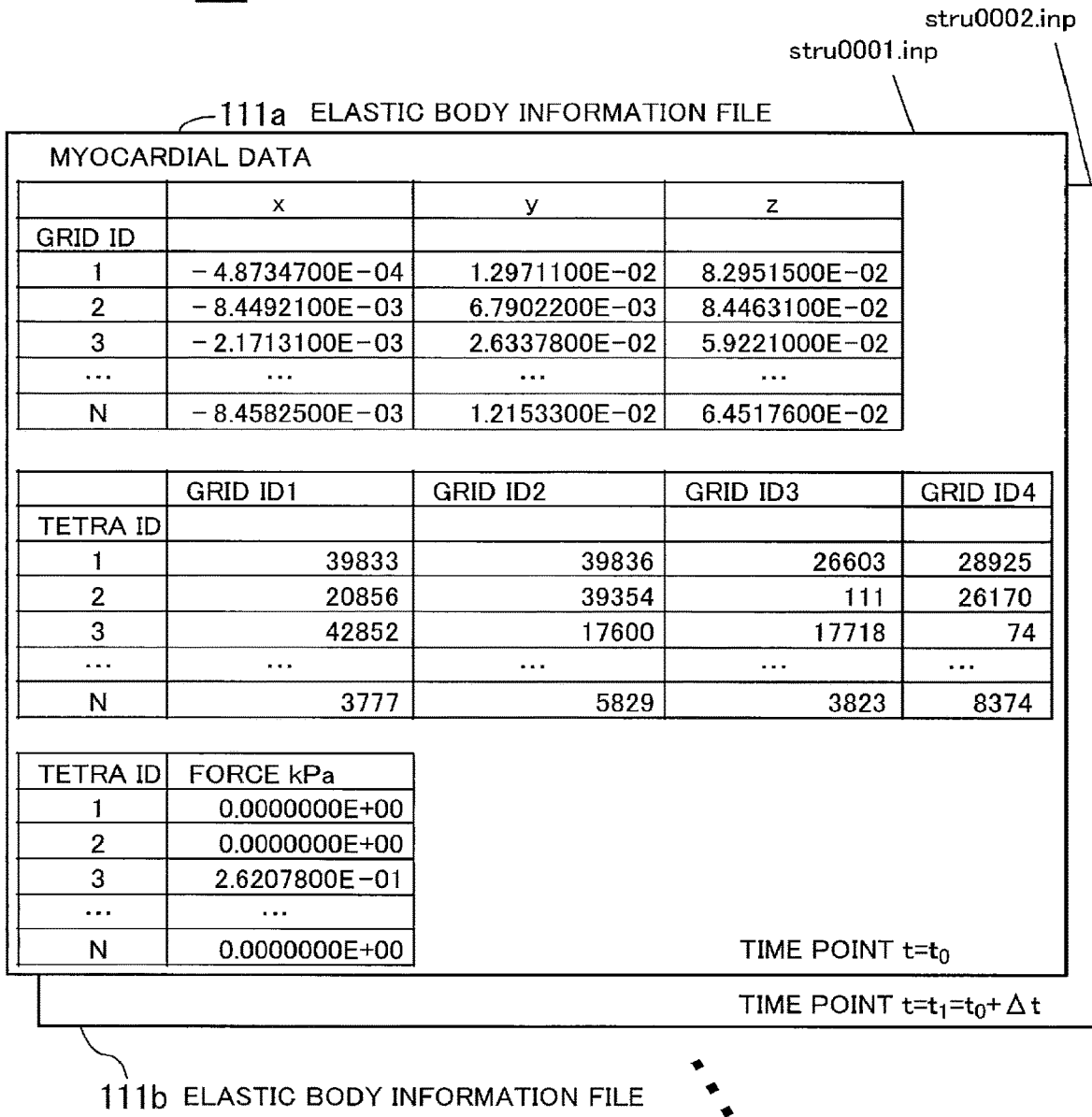
FIG. 6 illustrates an example of a group of elastic body information files.

FIG. 6 illustrates an example of the group of elastic body information files 111. The group of elastic body information files 111 is a group of elastic body information files 111a, 111b, and so on per simulation time point. Each of the elastic body information files 111a, 111b, and so on is given a file name such as "stru(X).inp". In this case, the "X" in an individual file name represents a number, and these numbers are given in ascending order in accordance with the chronological order of the simulation time points.

The elastic body information files 111a, 111b, and so on include myocardial data indicating the shape of the heart at the respective time points. The myocardial data includes coordinate values along the x, y, and z axes of an individual grid (vertexes arranged in 3D space), an individual grid ID indicating four vertexes of a tetrahedral element (TETRA) included in the myocardium, and force applied to an individual element.

FIG. 7 illustrates an example of the group of fluid information files 112. The group of fluid information files 112 is a group of fluid information files 112a, 112b, and so on per simulation time point. For example, each of the fluid information files 112a, 112b, and so on is given a file name such as "flui(Y).inp". In this case, the "Y" in an individual file name represents a number, and these numbers are given in ascending order in accordance with the chronological order of the simulation time points.

The fluid information files 112a, 112b, and so on include blood flow data indicating the blood flow at the respective time points. The blood flow data includes coordinate values along the x, y, and z axes of an individual grid (vertexes arranged in 3D space), an individual grid ID indicating four vertexes of a tetrahedral element (TETRA) included in a blood vessel, and an individual velocity field vector indicating the direction and velocity of blood flowing in an individual element.

The visualization apparatus 100 calculates and visualizes streaklines based on the simulation results illustrated in FIGS. 6 and 7. Hereinafter, streakline visualization processing will be described in detail.

Figure 8:
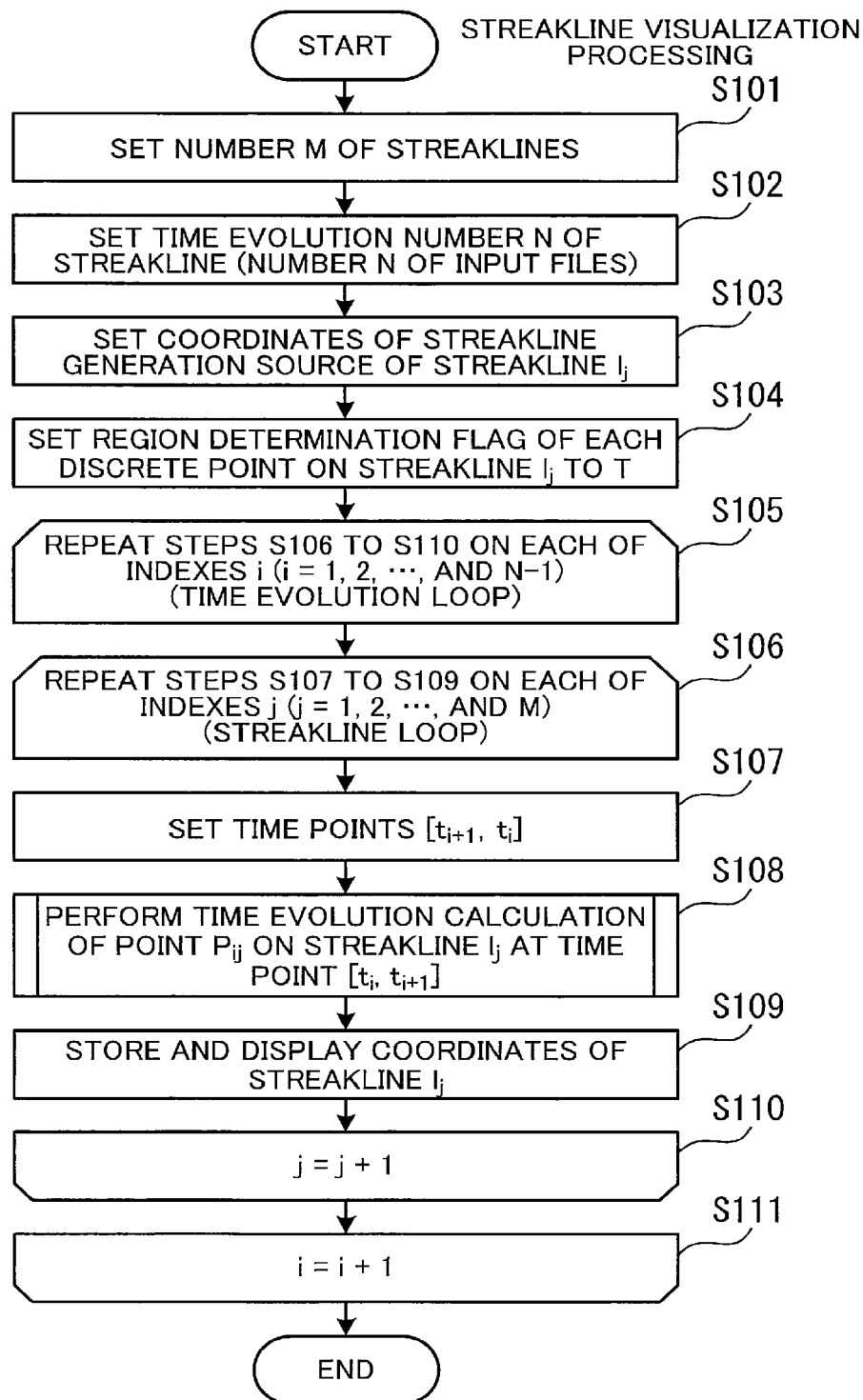
FIG. 8 is a flowchart illustrating an example of a procedure of streakline visualization processing.

FIG. 8 is a flowchart illustrating an example of a procedure of streakline visualization processing. Hereinafter, the processing illustrated in FIG. 8 will be described step by step.

First, in steps S101 to S104, the streakline calculation unit 130 performs initial settings of an individual streakline.

[Step S101] The streakline calculation unit 130 sets the number M of streaklines to be calculated (M is an integer of 1 or more). For example, the streakline calculation unit 130 sets a value inputted by the user as the number M of streaklines.

[Step S102] The streakline calculation unit 130 sets the number N of streakline calculations (N is an integer of 1 or more). Hereinafter, the number N of streakline calculations will be referred to as "time evolution number". For example, the streakline calculation unit 130 sets a value inputted by the user as the time evolution number N.

Since streaklines change over time, a series of time points $t_0, t_1, \ldots,$ and $t_N$, at which results of streaklines are outputted, are determined by setting the time evolution number N. When the specified time evolution number N is larger than the number L of files (L is an integer of 1 or more), the streakline calculation unit 130 may treat the (L+1)th file as a beat in the second cardiac cycle and uses the file at the time point to for the (L+1)th file. For example, the time interval in the series of time points is set to be 0.01 second. However, alternatively, the series of time points may have irregular time intervals.

[Step S103] The streakline calculation unit 130 sets coordinates of a streakline generation source. For example, the streakline calculation unit 130 sets a point specified by the user in the analysis space as the coordinates of a streakline generation source. For example, the user specifies a point in the space while referring to the myocardial information and the blood flow information. The streakline calculation unit 130 reads the coordinates of the specified point as a coordinate vector $X_0$. When the number of streaklines is 1, the streakline generation source is set to have the coordinate vector $X_0$. When the number of streaklines is a plural number, the streakline calculation unit 130 randomly sets a generation source of a streakline $l_j$ in a sphere having the coordinate vector $X_0$ as its center and having a radius r (r is a positive real number). The generation source is selected from the coordinates in the blood flow. The streakline calculation unit 130 sets a coordinate vector $X_j$ of the set generation source as the streakline generation source.

Next, the streakline calculation unit 130 performs initial settings of the jth (j=1, 2, . . . , M) streakline $l_j$ as follows.

The jth streakline $l_j$ is formed by discrete points matching the time evolution number N. Thus, the streakline calculation unit 130 generates points $P_{ij}$ (i=0, 1, 2, . . . , N) indicating the discrete points included in the streakline $l_j$. The streakline calculation unit 130 sets coordinates of initial values of individual discrete points as coordinates of particle generation sources.

When a streakline at the time point $t=t_1$ is calculated, an individual point $P_{ij}$ (i=0, 1, 2, . . . , i) is subjected to time evolution calculation as the position of a streakline particle emitted from the corresponding generation source. Since no streakline particles corresponding to the point $P_{ij}$ (i=i+1, . . . , N) have been emitted from any generation sources, these streakline particles are not subjected to the calculation when the streakline at the time point $t=t_i$ is calculated. In addition, the streakline calculation unit 130 calculates the discrete points in ascending order of the value i. Thus, a discrete point calculated earlier has a longer time since the emission from the corresponding particle generation source.

[Step S104] The streakline calculation unit 130 performs settings for a case in which a point on a streakline has fallen in a large artery or the like, namely, outside a fluid boundary in the target system. The point $P_{ij}$ on a streakline could fall in a large artery or the like, namely, outside the system through a fluid boundary. In such cases, since no fluid velocity field is defined outside the system, the calculation of the point $P_{ij}$ at the next time point fails to be performed. Thus, the streakline calculation unit 130 sets a region determination flag to each point $P_{ij}$ as a parameter of the individual discrete point. When the point $P_{ij}$ has fallen within the target region, the region determination flag indicates "T". By contrast, when the point $P_{ij}$ has drifted by the flow of fluid in a large artery or the like and fallen outside the target region, the region determination flag indicates "F". Since the fluid includes all the points $P_{ij}$ in the initial settings, the streakline calculation unit 130 sets the region determination flag of each discrete point to "T".

[Step S105] The streakline calculation unit 130 repeats a group of steps S106 to S110 on each of the indexes i (i=1, 2, . . . , and N−1) in ascending order from index i=1.

[Step S106] The streakline calculation unit 130 repeats a group of steps S107 to S109 on each of the indexes j (j=1, 2, . . . , and M) in ascending order from index j=1.

[Step S107] The streakline calculation unit 130 sets a time point as the start of the time evolution and stores the time point in the memory 102. In the i-th calculation, the calculation start time point is set as $t=t_i$. The time evolution end time point is set as $t=t_{i+1}$.

[Step S108] The streakline calculation unit 130 performs time evolution calculation between the time points defined by $t_i \le t \le t_{i+1}$. Based on the time evolution calculation, all the points $P_{ij}$ (i=0, 1, 2, . . . , and i) emitted from an individual streakline generation source at each time point $t=t_i$ are subjected to time evolution, and all the points on the line are updated momentarily. As a result of the time evolution calculation of the individual points $P_{ij}$ on the streakline $l_j$ at the time point $[t_i, t_{i+1}]$, coordinate values are acquired, which are set as the coordinates $P_{i+1,j}$ at the next time point $t=t_{i+1}$.

[Step S109] The streakline calculation unit 130 stores the acquired calculation results in a memory. Based on the calculation results, the display processing unit 140 visualizes a streakline. In addition, the streakline calculation unit 130 is capable of outputting coordinate values of a streakline to a file.

[Step S110] Each time the streakline calculation unit 130 performs the group of steps S107 to S109, the streakline calculation unit 130 adds 1 to the index j. After performing steps S107 to S109 on the index j=M, the streakline calculation unit 130 performs step S111.

[Step S111] Each time the streakline calculation unit 130 performs the group of steps S106 to S110, the streakline calculation unit 130 adds 1 to the index i. After performing steps S106 to S110 on the index j=N−1, the streakline calculation unit 130 ends the streakline visualization processing.

Next, the time evolution calculation processing (step S108) will be described in detail.

Figure 9:
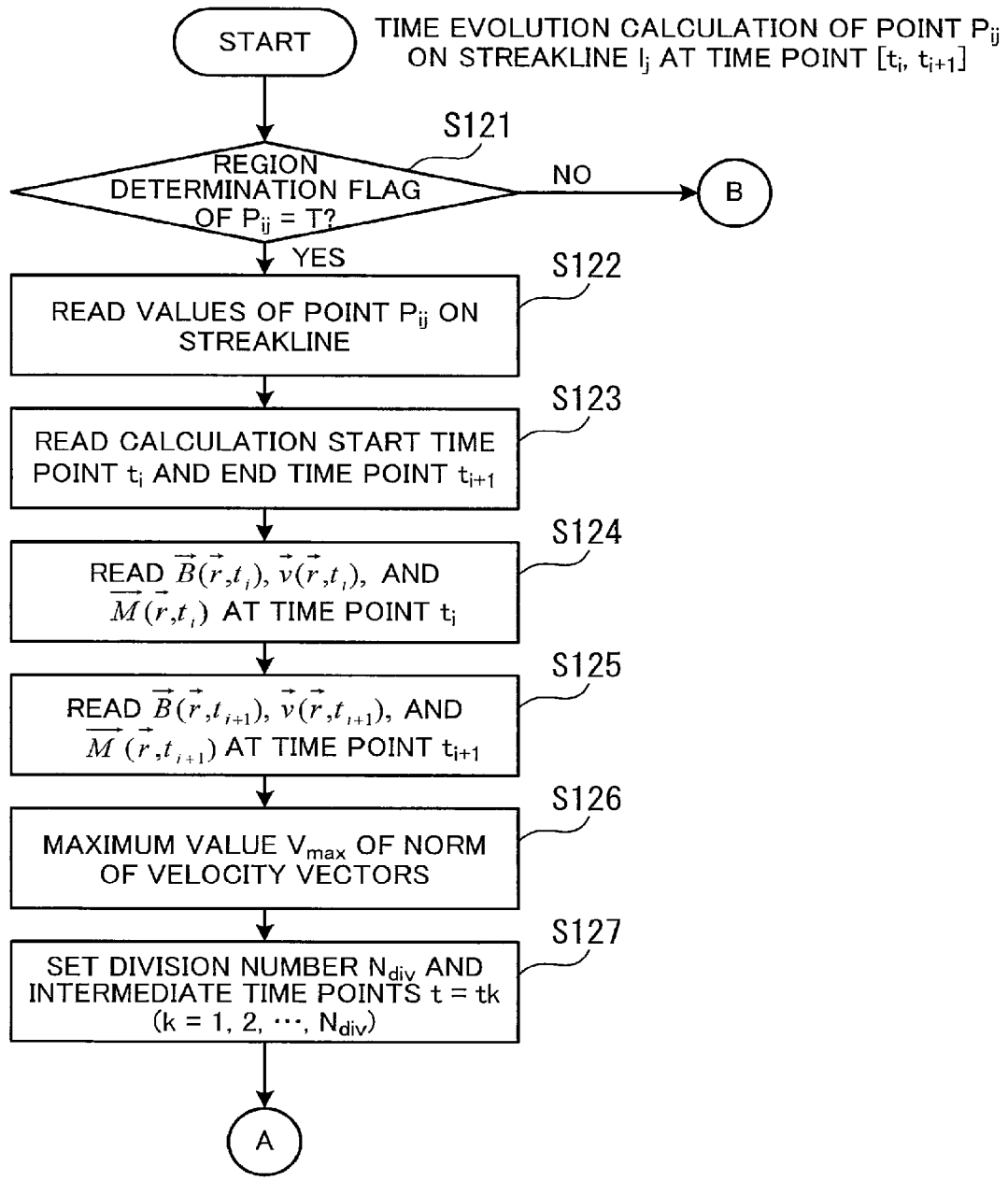
FIGS. 9 and 10 illustrate a flowchart illustrating a procedure of time evolution calculation processing.
Figure 10:
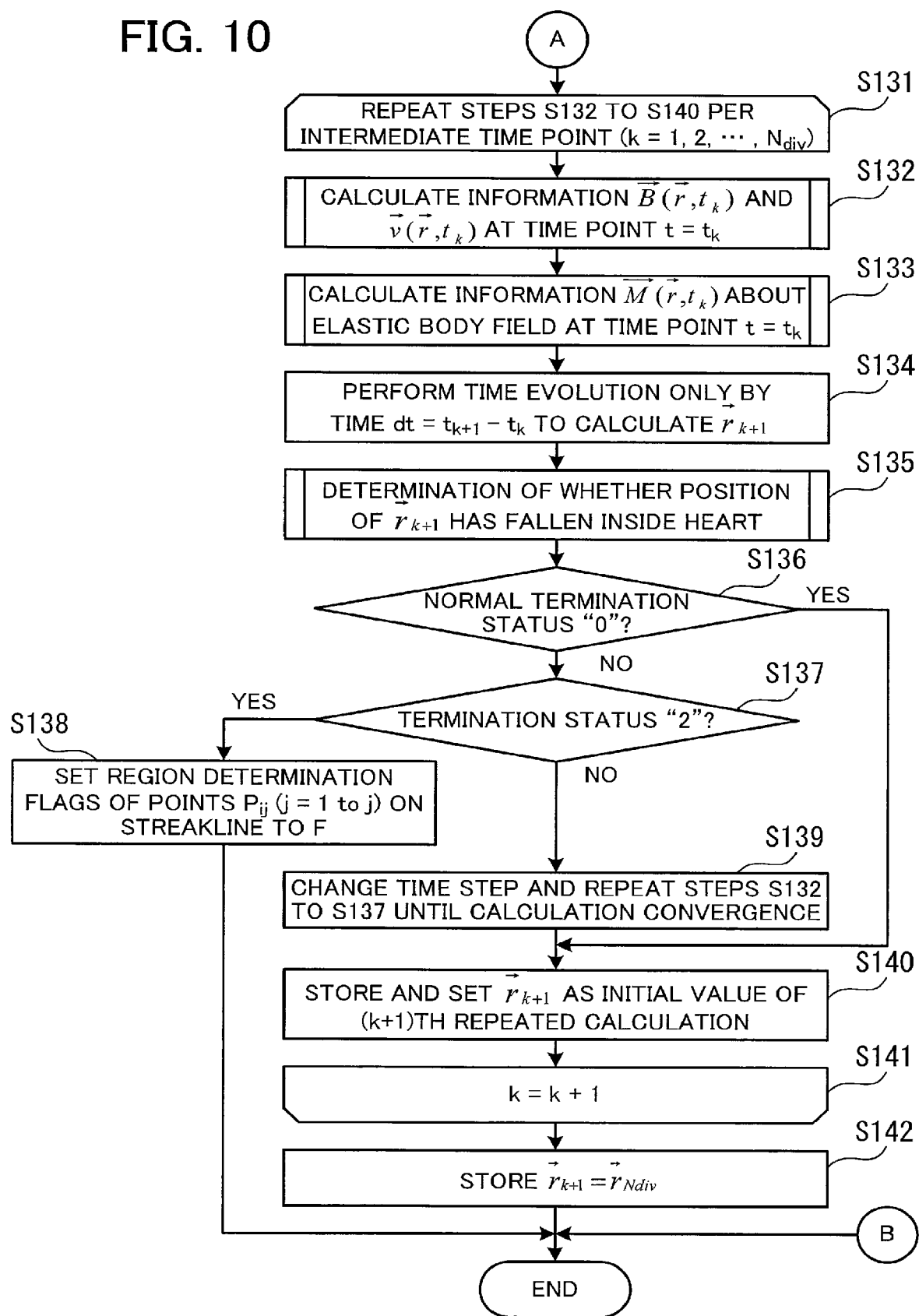

FIGS. 9 and 10 illustrate a flowchart illustrating a procedure of time evolution calculation processing. Hereinafter, the processing illustrated in FIG. 9 will be described step by step.

[Step S121] The streakline calculation unit 130 reads the region determination flag of the point $P_{ij}$. The streakline calculation unit 130 determines whether the region determination flag indicates "T". When the region determination flag indicates "T", the processing proceeds to step S122. When the region determination flag indicates "F", the streakline calculation unit 130 determines that this point has fallen outside the region and ends the time evolution calculation processing without performing the calculation. Thus, when the region determination flag indicates "F", the streakline calculation unit 130 does not update the coordinate values.

[Step S122] The streakline calculation unit 130 reads the coordinate values of the point $P_{ij}$.

[Step S123] The streakline calculation unit 130 reads calculation start time point $L=t_i$ and calculation end time point $t=t_{i+1}$ from the memory 102.

[Step S124] The streakline calculation unit 130 reads a grid information vector B (vector r, $t_i$) and a velocity field vector v (vector r, $t_i$) of the fluid portion at the calculation start time point $t=t_i$ from the file flui(i).inp via the information reading unit 120. In addition, the streakline calculation unit 130 reads a vector M (vector r, $t_i$), which is grid information about the elastic body of the myocardium portion (information about the structure of the myocardium), from the file stru(i).inp via the information reading unit 120.

[Step S125] The streakline calculation unit 130 reads a grid information vector B (vector r, $t_{i+1}$) and a velocity field vector v (vector r, $t_{i+i}$) of the fluid portion at the calculation start time point $t=t_{i+1}$ from the file flui(i).inp via the information reading unit 120. In addition, the streakline calculation unit 130 reads a vector M (vector r, $t_{i+1}$) from the file stru(i+1).inp via the information reading unit 120.

[Step S126] The streakline calculation unit 130 calculates the norm of the velocity field vectors of the grid points indicated by the file flui(i).inp and the file flui(i+1).inp (the length of the velocity field vectors) and calculates the maximum value of the velocity in the corresponding time section by using an interpolation expression. The streakline calculation unit 130 stores the calculated maximum value in the memory 102 as $V_{max}$.

[Step S127] If the streakline calculation unit 130 calculates the section [$t_i$, $t_{i+1}$] in a single time evolution, the accuracy is not sufficient. Thus, the streakline calculation unit 130 equally divides the section [$t_i$, $t_{i+1}$] by $N_{div}$ ($N_{div}$ is an integer of 1 or more) and sets intermediate time points ($t=t_k$ (k=1, 2, . . . , and $N_{div}$)). In this way, the section is divided into [$t_i$, $t_{i+1}+\Delta t$], [$t_i+\Delta t$, $t_i+2\Delta t$], . . . , and [$t_i+(N_{div}-1)\Delta t$, $t_{i+1}$]. The streakline calculation unit 130 sets an optimum value as the division number $N_{div}$ by itself. The division number $N_{div}$ may be given externally. Next, the processing proceeds to step S131 in FIG. 10.

Hereinafter, the processing illustrated in FIG. 10 will be described step by step.

[Step S131] The streakline calculation unit 130 performs the time evolution calculation by repeating a group of steps S132 to S140 per intermediate time point ($t=t_k$ (k=1, 2, . . . , and $N_{div}$)) from k=1 to k=$N_{div}$. As a result, a coordinate vector $r_k$ is obtained for each intermediate time point $t=t_k$, and a coordinate vector $r_{Ndiv}$=vector $r_{i+1}$ of a point $P_{i+1j}$ at the time point $t=t_{i+1}$ is obtained.

[Step S132] The streakline calculation unit 130 calculates information about the field at the time point $t=t_k$ (a fluid structure information vector B (vector r, $t_k$) and a velocity field vector v (vector r, $t_k$)). This step will be described in detail below with reference to FIG. 13.

[Step S133] The streakline calculation unit 130 calculates information about the elastic body field at the time point $t=t_k$ (a myocardium structure information vector M (vector r, $t_k$)). This step will be described in detail below with reference to FIG. 14.

[Step S134] The streakline calculation unit 130 performs time evolution only by time $dt=t_{k+1}-t_k$ to calculate a vector $r_{k+1}$.

The streakline calculation unit 130 may perform the time evolution per intermediate time point in steps S132 to S134 as follows. Assuming that the point $P_{i+1j}$ is at the vector $r_k$ when the time point $t=t_k$, a streakline equation is expressed by expression (1).

$$\frac{d\vec{r}}{dt} = \vec{v}(\vec{r}, t) \qquad (1)$$

In expression (1), the vector v (vector r, t) is the velocity (field) at the time point t and the position vector r. Thus, the coordinates after the time $\Delta t$ are calculated by numerically solving the expression (1), which is an ordinary differential equation. The following calculation expressions are obtained by solving expression (1) with the Fourth-order Runge-Kutta method.

$$\vec{r}_{k+1} = \vec{r}_k + \frac{\Delta t}{6}(\vec{v}_1 + 2\vec{v}_2 + 2\vec{v}_3 + \vec{v}_4) \qquad (2)$$

$$\vec{v}_1 = v(\vec{r}_k, t_k) \qquad (3)$$

$$\vec{v}_2 = v\left(\vec{r}_k + \frac{\Delta t}{2}\vec{v}_1, t_k + \frac{\Delta t}{2}\right) \qquad (4)$$

$$\vec{v}_3 = v\left(\vec{r}_k + \frac{\Delta t}{2}\vec{v}_2, t_k + \frac{\Delta t}{2}\right) \qquad (5)$$

$$\vec{v}_4 = v(\vec{r}_k + \Delta t\vec{v}_3, t_k + \Delta t) \qquad (6)$$

The velocity field vector v (vector r, $t_k$) at any position vector r when the time point $t=t_k$ may be calculated from the vector v (vector r, $t_i$), the vector v (vector r, $t_{i+1}$), the vector B (vector r, $t_i$), the vector B (vector r, $t_{i+1}$), the vector M (vector r, $t_i$), and information about a moving boundary surface $S_k$ at the time point $t=t_k$. Hereinafter, the moving boundary surface will simply be referred to as a "boundary surface". The information about the boundary surface $S_k$ at the time point $t=t_k$ may be calculated from the vector M (vector r, $t_i$). Thus, expressions (3) to (6) are calculated. By substituting these results into expression (2), the streakline calculation unit 130 calculates the vector $r_{k+1}$.

[Step S135] The streakline calculation unit 130 performs determination of whether the position of the vector $r_{k+1}$ has fallen inside the heart. The streakline calculation unit 130 performs this processing because the calculated vector $r_{k+1}$ includes an infinite time width error and could enter the myocardium. After the position determination as a subroutine, a status indicating the result of the position determined is acquired. For example, when the vector has not crossed or entered the myocardium, "0" or "2" as a normal termination status is acquired. When the vector $r_{k+1}$ indicates a position in an element in the analysis target fluid (for example, in an atrium or a ventricle), the status "0" is acquired. When the vector $r_{k+1}$ indicates a position outside an element in the analysis target fluid (for example, in an artery), the status "2" is acquired. This step will be described below in detail with reference to FIG. 17.

[Step S136] The streakline calculation unit 130 determines whether the determination result indicates the status "0" indicating normal termination. When the determination result indicates the status "0", the processing proceeds to step S140. When the determination result does not indicate the status "0", the processing proceeds to step S137.

[Step S137] The streakline calculation unit 130 determines whether the determination result indicates the status "2" indicating termination. The case in which the status "2" is acquired corresponds to a case in which the point $P_{ij}$ has moved to an external element outside the system such as to a large artery through the fluid boundary during the calculation. When the determination result indicates the status "2", the processing proceeds to step S138. Otherwise, the processing proceeds to step S139.

[Step S138] When the point $P_{ij}$ has fallen outside the system, the streakline calculation unit 130 sets the region determination flags of the points $P_{ij}$ (j=1 to j) on the streakline to "F". The individual region determination flag "F" indicates that the corresponding point $P_{ij}$ has fallen outside the analysis region. Next, the streakline calculation unit 130 ends the time evolution calculation processing. In this way, when the termination status indicates "2", the streakline calculation unit 130 determines that the point $P_{ij}$ has fallen outside the system and sets the region determination flags to "F". A streakline is drawn by connecting curves formed by sequentially connecting points $P_{i1}$, $P_{i2}, P_{i3}, \ldots$, and $P_{iN}$. Thus, when any point $P_{ij}$ is determined to have fallen outside the region, there is no reason to draw the previous points emitted from the particle generation source. Thus, the streakline calculation unit 130 sets all the region determination flags of the points $P_{ij}$ (j=1 to j) to "F" and ends the processing.

[Step S139] When the determination result does not indicate normal termination (when the status is neither "0" nor "2"), the streakline calculation unit 130 decreases the time step functioning as a control parameter. Namely, the streakline calculation unit 130 further divides the calculation by more time points and repeats the group of steps S132 to S137. After decreasing the time step, when the streakline calculation unit 130 determines normal termination, the processing proceeds to step S140.

When the vector $r_{k+1}$ has fallen outside the predicted sphere, the streakline calculation unit 130 does not determine normal termination, either. In this case, for example, by increasing the radius of the predicted sphere and performing recalculation, the streakline calculation unit 130 is able to prevent the vector $r_{k+1}$ from falling outside the predicted sphere.

[Step S140] The streakline calculation unit 130 stores the vector $r_{k+1}$ in a memory and sets the stored value as the initial value of the (k+1)th repeated calculation.

[Step S141] Each time the streakline calculation unit 130 performs the group of step S132 to S140, the streakline calculation unit 130 adds 1 to the index k and repeats the processing. When the streakline calculation unit 130 completes the time evolution calculation on all the intermediate time points (k=$N_{div}$), the processing proceeds to step S142.

[Step S142] The streakline calculation unit 130 stores the finally calculated vector $r_{Ndiv}$ as the vector $r_{k+1}$ in a memory.

The coordinates of the points on a streakline are updated by the processing illustrated in FIGS. 9 and 10.

FIG. 11 illustrate data examples of streaklines. As illustrated in FIG. 11, the coordinate values of the points on the streaklines are set per analysis time point. As the initial values of the points on the streaklines at the time point t=$t_0$, the coordinate values of the particle generation sources are set. When the time point t=$t_1$, the coordinate values of the points indicating the positions of the initially emitted particles are updated. Next, as the time point is updated, new particles are emitted, and the coordinate values of the points indicating the positions of the new and old particles emitted are updated. In FIG. 11, the coordinate values of the points whose positions have been changed from their previous time points are underlined.

Next, the processing (steps S132 and S133) for calculating information about the structure (grid coordinates) and the velocity field of the fluid portion and information about the structure (grid coordinates) of the elastic body (myocardium) portion when the time point t=$t_k$ will be described in detail. The information about the structure (grid coordinates), i.e., the vector B (vector r, $t_k$), and the information about the velocity field of the fluid portion, i.e., the vector v (vector r, $t_k$), is used for the calculation of expressions (3) to (6). The information about the structure of the elastic body is used to determine whether a streakline has crossed the myocardium and is represented by a vector M (vector r, $t_k$).

Data is outputted only at the time point t=$t_i$ and t=$t_{i+1}$. Thus, since the grid coordinates and the velocity field are not defined at the intermediate time $t_k$, which are calculated by the Runge-Kutta method, the streakline calculation unit 130 calculates an approximate value of the field from the velocity fields of the output files. A key consideration for this calculation is to move the grid position momentarily when the simulation is executed. While the grid position may be determined in any way, an Arbitrary Lagrangian-Eulerian (ALE) method is often used to solve a problem in which a boundary of an object such as a heart moves. In the ALE method, the coordinates used in a simulation are independently determined so as not to deteriorate the accuracy of the solution of a partial differential equation described. In many cases, a partial differential equation is used for this determination. However, the governing equation for determining the grid position is not available to one in the position of the data analysis while only the output values of the grid points given are available. In this case, the positions of the grid points continuously change over time.

Figure 12:
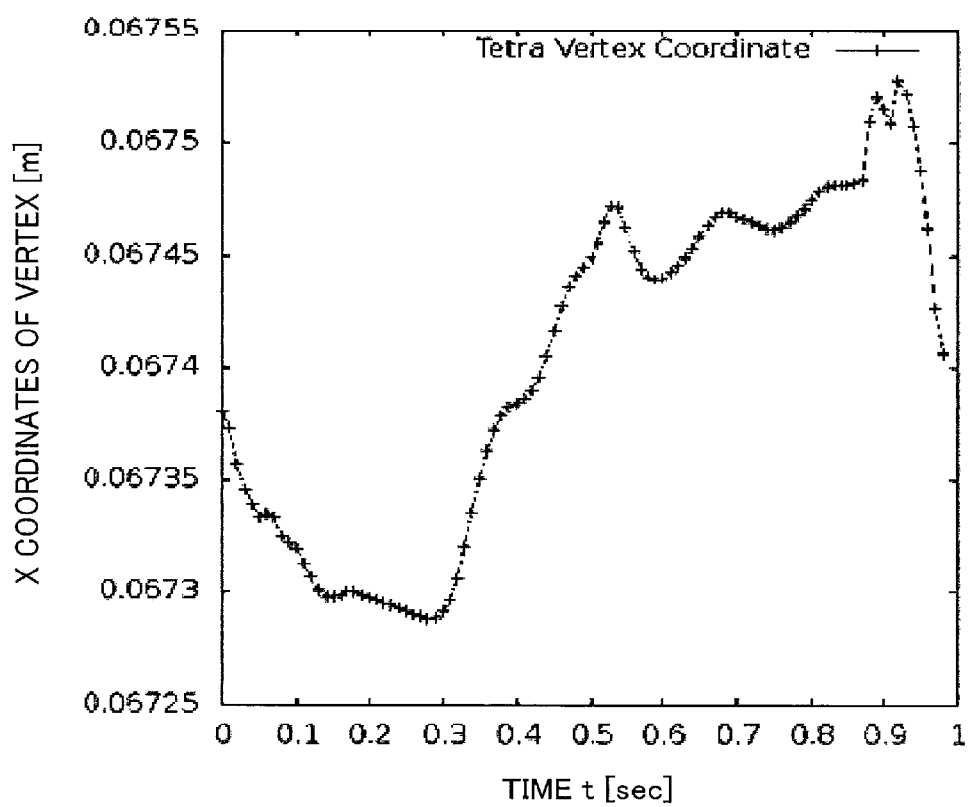
FIG. 12 illustrates how the position of a grid point continuously changes over time.

FIG. 12 illustrates how the position of a grid point continuously changes over time. In FIG. 12, the horizontal axis represents time, and the vertical axis represents X coordinate values of a grid point (vertex). As illustrated in FIG. 12, the position of an individual grid point continuously changes over time. Thus, in view of this fact, the streakline calculation unit 130 estimates a grid position at any time point by using an interpolation method.

Figure 13:
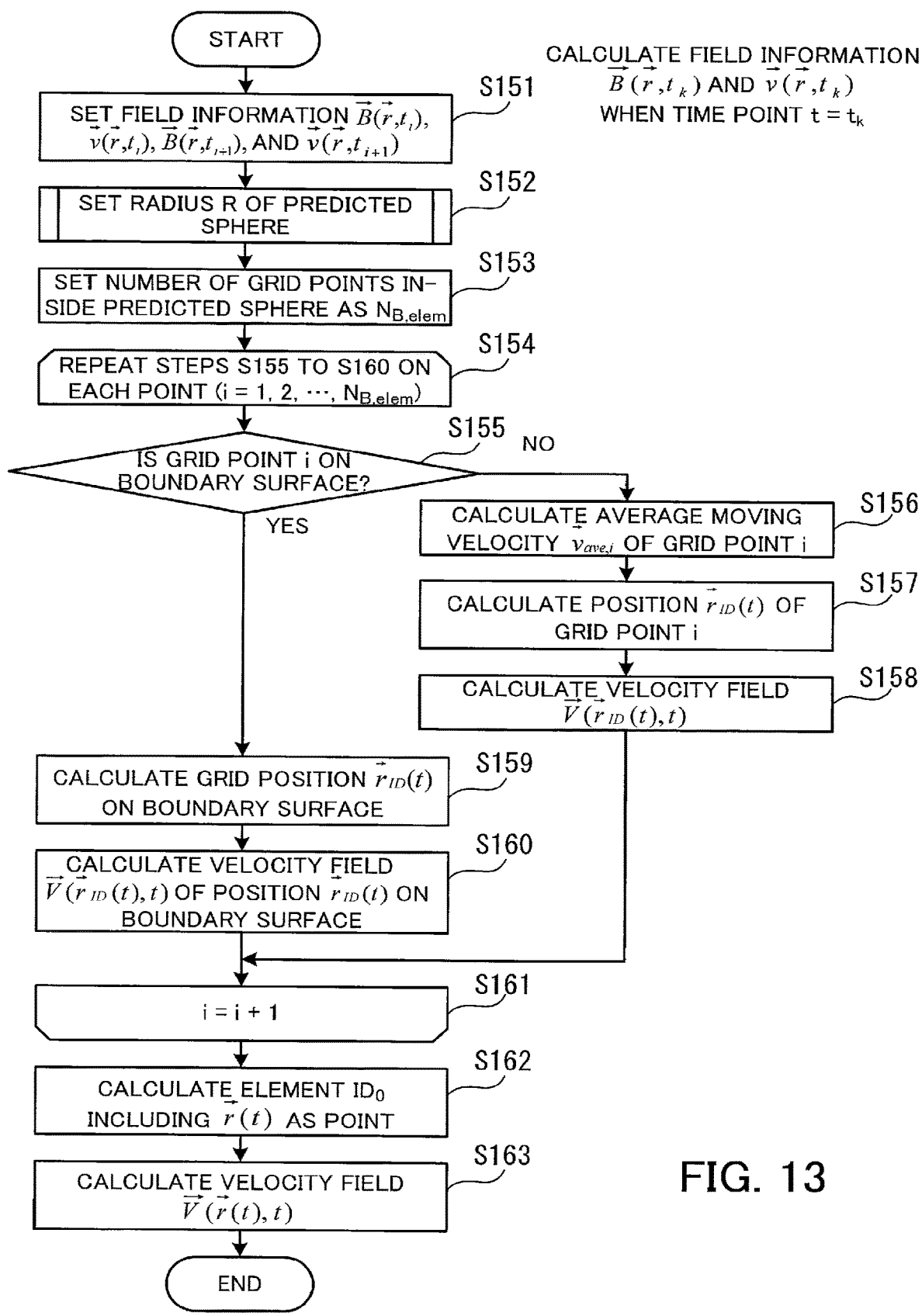
FIG. 13 is a flowchart illustrating an example of a procedure of processing for calculating field information when a time point $t=t_k$.

FIG. 13 is a flowchart illustrating an example of a procedure of processing for calculating field information when the time point t=$t_k$. Hereinafter, the processing illustrated in FIG. 13 will be described step by step.

[Step S151] The streakline calculation unit 130 sets field information at the time point $t_k$ in a memory. The set information includes the vector B (vector r, $t_i$), the vector v (vector r, $t_i$), the vector B (vector r, $t_{i+1}$), and the vector v (vector r, $t_{i+1}$).

The time point $t_k$ satisfies $t_i \le t_k \le t_{i+1}$. In addition, the vector B (vector r, $t_i$), the vector v (vector r, $t_i$), the vector B (vector r, $t_{i+1}$), and the vector v (vector r, $t_{i+1}$) are known. These vector values have already been read from files in steps S124 and S125.

First, the streakline calculation unit 130 performs the following processing on the grid points that define the structure of the fluid portion. However, for reduction of the calculation amount, the streakline calculation unit 130 theoretically calculates the maximum moving distance of point $P_{i+1j}$ and performs the processing on only the grid points inside a sphere having a radius R equal to the maximum moving distance. This sphere will hereinafter be referred to as a "predicted sphere".

[Step S152] The streakline calculation unit 130 sets the radius R of the predicted sphere. This processing will be described in detail below with reference to FIG. 20.

[Step S153] The streakline calculation unit 130 searches for fluid grid points inside the radius R of the predicted sphere and sets the number of grid points inside the predicted sphere as $N_{B,elem}$.

[Step S154] The streakline calculation unit 130 performs a group of steps S155 to S160 on each of the $N_{B,elem}$ grid points inside the radius R of the predicted sphere.

[Step S155] The streakline calculation unit 130 determines whether the grid point i is on a boundary surface. If the grid point i is on a boundary surface, the processing proceeds to step S159. If not, the processing proceeds to step S156.

[Step S156] When the grid point is not on a boundary surface, the streakline calculation unit 130 calculates an average moving velocity vector $v_{ave,i}$ of the grid point i. The streakline calculation unit 130 performs this calculation by interpolating the coordinates of an individual grid point at the time point $t_k$. In this case, since the time at which the individual grid point is outputted is short, the calculation is approximated by a first-order equation. Thus, the average moving velocity vector $v_{ave}$ of a coordinate vector $r_{ID}(t)$ at the time point t of a grid point having a certain ID is calculated by the following expression.

$$\vec{V}_{ave} = \frac{\vec{r}_{ID}(t_{i+1}) - \vec{r}_{ID}(t_i)}{t_{i+1} - t_i} \qquad (7)$$

[Step S157] By using the average moving velocity vector $v_{ave}$, the streakline calculation unit 130 calculates a position vector $r_{ID}(t)$ of the grid point i. The position vector $r_{ID}(t)$ is calculated by the following expression.

$$\vec{r}_{ID}(t) = \vec{r}_{1D}(t_i) + \vec{V}_{ave}(t-t_i)\{\vec{r}_{ID}(t) \neq S(t)\} \qquad (8)$$

[Step S158] The streakline calculation unit 130 calculates a velocity field vector V (vector $r_{ID}(t)$, t) of the grid point on a non-boundary surface. The streakline calculation unit 130 performs this calculation by using the following expression (9).

$$V_j(\vec{r}_k(t), t) \cong V_j(\vec{r}_{k0}, t_i) + (\vec{r}_{kt} - \vec{r}_{ki}) \cdot \nabla V_j|_{\vec{r}_{k0}, t_i} - \qquad (9)$$
$$\frac{t - t_i}{t_{i+1} - t_i}(\vec{r}_{ki+1} - \vec{r}_{ki}) \cdot \nabla V_j\Big|_{\vec{r}_{ki+1}, t_{i+1}} +$$
$$\frac{t - t_i}{t_{i+1} - t_i}(V_j(\vec{r}_{ki+1}, t_{i+1}) - V_j(\vec{r}_{ki}, t_i)) +$$
$$\frac{t - t_i}{t_{i+1} - t_i}(\vec{r}_{kt} - \vec{r}_{ki}) \cdot (\nabla V_j|_{\vec{r}_{ki+1}, t_{i+1}} - \nabla V_j|_{\vec{r}_{ki}, t_i})$$

[Step S159] The streakline calculation unit 130 calculates a vector $r_{ID}(t)$ indicating a grid position on the boundary surface by using the following expression (10).

$$\vec{r}_{ID}(t) = \Sigma_{k=0}^{3} \vec{a}_k (t-t_i)^k \qquad (10)$$

[Step S160] The streakline calculation unit 130 calculates a velocity field vector V (vector $r_{ID}(t)$, t) of the vector $r_{ID}(t)$ indicating the grid position on the boundary surface by using the following expression (11).

$$\vec{v}_{ID}(t) = \sum_{k=1}^{3} k\vec{a}_k (t-t_i)^{k-1} \qquad (11)$$

[Step S161] Each time the streakline calculation unit 130 performs the group of steps S155 to S160, the streakline calculation unit 130 adds 1 to the index i and repeats the group of steps S155 to S160. When the streakline calculation unit 130 has completed the calculation on the index i=$N_{B,elem}$, the streakline calculation unit 130 has completed the calculation of the velocity fields of all the grid points inside the predicted sphere.

[Step S162] The streakline calculation unit 130 calculates an element number $ID_0$ including a point vector r(t) to be calculated.

[Step S163] The streakline calculation unit 130 calculates a velocity field vector V (vector r(t), t) at the point vector r(t) to be calculated, from grid point information $r_{ID0}(t)$ included in the element number $ID_0$, by using the following equation (12).

$$V_j(\vec{r}, t) \cong \Sigma_{k=1}^{4} N_k(\vec{r}(t)) V_j(\vec{r}_k(t), t) \qquad (12)$$

Next, the streakline calculation unit 130 ends the processing for calculating the field information when the time point t=$t_k$.

In the processing illustrated in FIG. 13, aside from the calculation of the position vector $r_{ID}(t)$ on the non-boundary surface in step S157, the grid position vector $r_{ID}(t)$ on the boundary surface is calculated in step S159. This is because, regarding a boundary surface S(t), a slip-free boundary condition is defined in a Navier-Stokes equation and functions as a restraint condition. Thus, the streakline calculation unit 130 determines whether a grid point to be calculated is on the boundary surface S(t). If so, the streakline calculation unit 130 determines the grid position vector that satisfies the boundary condition. Thus, the streakline calculation unit 130 performs the following calculation.

Assuming that a point in the topology space formed by the grid point position on the boundary surface S(t) and the corresponding velocity field is represented by (vector $r_{ID}(t)$, vector $v_{ID}(t)$), values at the time points $t_i$ and $t_{i+1}$ have been outputted. Thus, (vector $r_{ID}(t_i)$, vector $v_{ID}(t_i)$) and (vector $r_{ID}(t_{i+1})$, vector $v_{ID}(t_{1+1})$) are determined. Since a slip-free boundary condition is set in a Navier-Stokes equation regarding viscous fluid, the following relationship is established between the grid position vector $r_{ID}(t)$ and the velocity field vector $v_{ID}(t)$.

$$\frac{d}{dt}\vec{r}_{ID}(t) = \vec{v}_{ID}(t) \qquad (13)$$

Thus, since there is four data in total, regarding the grid point on the boundary surface S(t), by defining the vector $r_{ID}(t)$ with a three-order equation based on time, the condition is satisfied. Thus, expression (10) is obtained.

Regarding a coefficient vector $a_i$, assuming that components of the vector $r_{ID}(t)$ are expressed by $\xi_{ID}$ ($\xi$=x, y, z) and the corresponding differential components are expressed by v$\xi$ ($\xi$=x, y, z), the following expressions are obtained.

$$a_{3\xi} = -2\frac{\Delta\xi_{ID}}{(\Delta t_i)^3} + \frac{v_\xi(t_i) + v_\xi(t_{i+1})}{(\Delta t_i)^2} \qquad (14)$$

$$a_{2\xi} = \frac{1}{2}\frac{\Delta v_\xi}{\Delta t_i} - \frac{3}{2}\frac{V_\xi(t_i) + v_\xi(t_{i+1})}{\Delta t_i} + 3\frac{\Delta\xi_{ID}}{(\Delta t_i)^2} \qquad (15)$$

$$a_{1\xi} = v_\xi(t_i) \qquad (16)$$

$$a_{0\xi} = \xi_{ID}(t_i) \qquad (17)$$

In these expressions, the following relationships are used.

$$\Delta t_i = t_{i+1} - t_i \tag{18}$$

$$\Delta \xi_{ID}(t_{i+1}) - \xi_{ID}(t_i) \tag{19}$$

$$\Delta v_\xi = v_\xi(t_{i+1}) - v_\xi(t_i) \tag{20}$$

In this way, a group of position vectors $r_{ID}(t)$ on the boundary surface S(t) at any time point is evaluated (step S159 in FIG. 13). Thus, by calculating the positions of all the grid points in the fluid, the streakline calculation unit 130 is able to determine the vector B (vector r, $t_k$), which is the information about the structure of the fluid.

Next, how the streakline calculation unit 130 calculates the velocity field at a time point will be described. The velocity field may be divided into the X, Y, and Z components. Each of these components is a scalar field. Thus, by expressing the velocity field as $V_j$ (vector r, t) (j=X, Y, Z components), performing Talyor expansion until the first-order term around a point (vector $r_{k\,i}$, $t_i$) that is sufficiently close to the position vector r and that is in space time given data as output files, and ignoring the second-order term and the subsequent terms, the following expression is obtained.

$$V_j(\vec{r}_{kt}, t) \cong V_j(\vec{r}_{k0}, t_i) + (\vec{r}_{kt} - \vec{r}_{ki}) \cdot \nabla V_j + \frac{\partial v_j}{\partial t}(t - t_i) \tag{21}$$

In expression 21, the index k represents a grid ID, and the index i represents the i-th time point at which an output file exists. Since $\nabla V_j$ is a velocity gradient at a vertex of an individual element in a finite element method, $\nabla V_j$ is obtained by the following expression.

$$\nabla V_j = \sum_{k=1}^{4} \nabla N_k V_{jk} \tag{22}$$

In expression 22, $N_k$ is referred to as a structure function and given as a polynomial, and $V_{jk}$ is a value representing a velocity field at an individual vertex and has been outputted to a file. Thus, by evaluating the time derivative term $\partial v_j/\partial t$ in the velocity field in expression (21) based on difference, the streakline calculation unit 130 is able to evaluate the velocity field on the non-boundary surface. Namely, the streakline calculation unit 130 is able to evaluate the velocity field by using the above expression (9) (step S160 in FIG. 13). As in the case of the field information, also for the vector M (vector r, t), which is the myocardium structure information, the streakline calculation unit 130 is able to calculate the grid point information at any time point.

Figure 14:
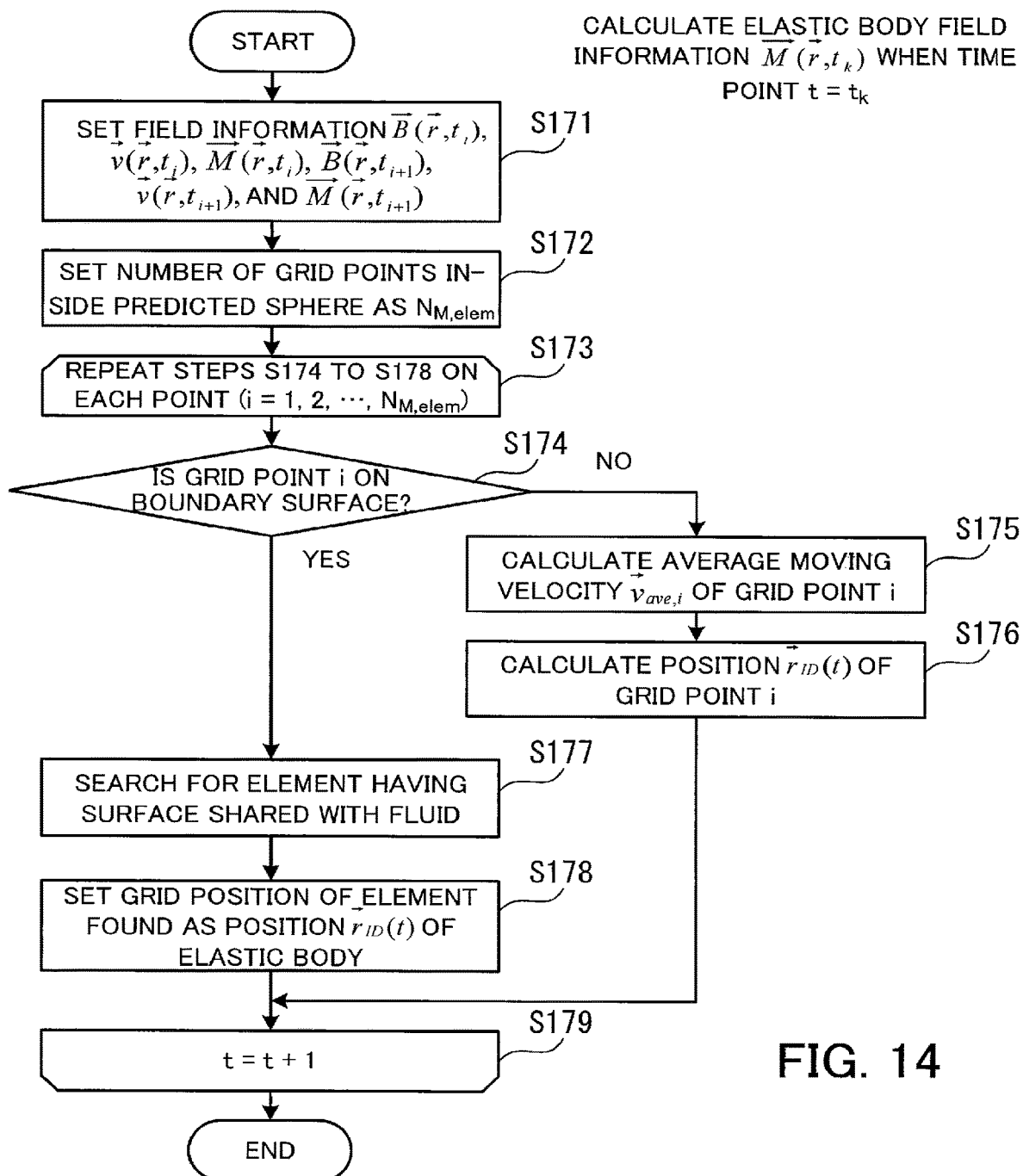
FIG. 14 is a flowchart illustrating an example of a procedure of processing for calculating elastic body field information when the time point $t=t_k$.

FIG. 14 is a flowchart illustrating an example of a procedure of processing for obtaining elastic body field information when the time point $t=t_k$. Hereinafter, the processing illustrated in FIG. 14 will be described step by step.

[Step S171] The streakline calculation unit 130 sets the read myocardium structure information in a memory. The set information includes the vector B (vector r, $t_i$), the vector v (vector r, $t_i$), the vector M (vector r, $t_i$), the vector B (vector r, $t_{i+1}$), the vector v (vector r, and the vector M (vector r, $t_{i+1}$).

[Step S172] The streakline calculation unit 130 searches for the structure of the myocardium inside the predicted sphere based on the radius R thereof and searches for the grid points of the myocardium. The radius R of the predicted sphere is the same radius R as used in the processing performed on the fluid portion. The streakline calculation unit 130 sets the detected number of grid points as $N_{M,elem}$.

[Step S173] The streakline calculation unit 130 performs a group of steps S174 to S178 on each of the $N_{M,elem}$ grid points inside the radius R of the predicted sphere.

[Step S174] The streakline calculation unit 130 determines whether the grid point i is on a boundary surface S(t). If the grid point i is on the boundary surface S(t), the processing proceeds to step S177. If not, the processing proceeds to step S175.

[Step S175] When the grid point is on a non-boundary surface S(t), as in the case of the fluid portion, the streakline calculation unit 130 calculates an average moving velocity vector $v_{ave,i}$ of the individual grid point i by using expression (7).

[Step S176] The streakline calculation unit 130 calculates a position vector $r_{ID}(t)$ of the grid point i by using expression (8).

[Step S177] When the grid point i is on the boundary surface S(t), since the grid position overlaps with the fluid portion, the streakline calculation unit 130 searches the fluid portion for the corresponding grid.

[Step S178] The streakline calculation unit 130 sets the grid coordinates found as the coordinates of the elastic body (myocardium) on the boundary surface S(t). However, this processing is based on the assumption that the individual points of the fluid portion on the boundary surface S(t) are calculated first.

[Step S179] Each time the streakline calculation unit 130 performs the group of steps S174 to S178, the streakline calculation unit 130 adds 1 to t and repeats the group of steps S174 to S178. When the streakline calculation unit 130 completes the calculation on the index i=$N_{M,elem}$, the streakline calculation unit 130 ends the processing for calculating the elastic body structure information when the time point $t=t_k$. In this way, the streakline calculation unit 130 is able to calculate the myocardium structure information vector (vector r, t).

Next, the determination of the position inside the myocardium will be described in detail.

Hereinafter, a procedure of determining the position of the vector $r_{k+1}$ obtained as a result of the time evolution inside the heart will be described. Since the Runge-Kutta method and the like include finite errors, the position vector $r_{k+1}$ obtained as a calculation result could fall on an unrealistic location.

Figure 15:
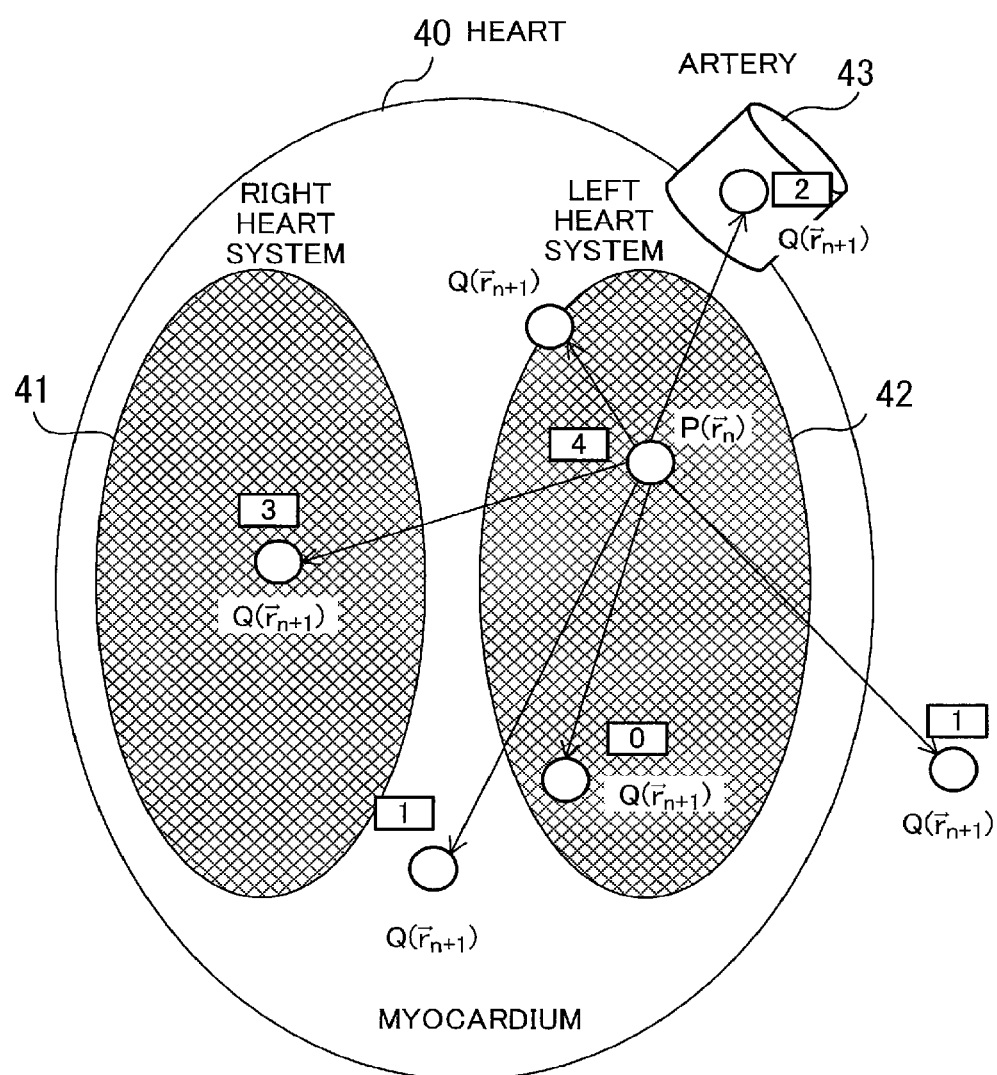
FIG. 15 illustrates examples of the positions that could be obtained as a result of calculation.

FIG. 15 illustrates examples of the positions that could be obtained as a result of calculation. The inside portions of a right heart system 41 and a left heart system 42 of a heart 40 are regions in which the analysis target fluid exists. The right heart system 41 includes a right atrium and a right ventricle. In the second embodiment, the left heart system 42 includes a left atrium and a left ventricle. The blood flow inside an artery 43 connected to the left heart system 42 is not the analysis target. However, a part of the large artery may be included in the simulation.

When a point $P_{kj}$ exists in the fluid at the time point $t=t_k$, there are five possible destinations after the movement by time evolution as illustrated in FIG. 15. Each of the destinations is given a corresponding status variable (status). When the point has not moved over a myocardial wall and has fallen within an element of the analysis target fluid, the status variable represents "0". When the point has moved over a myocardial wall and has fallen outside an element of the analysis target fluid, the status variable represents "1". When the point has not moved over a myocardial wall and has fallen outside an element of the analysis target fluid, the status variable represents "2". When the point has moved over a myocardial wall and has fallen inside an element of the analysis target fluid, the status variable represents "3". When the point has not moved over a myocardial wall and has fallen on a boundary between the myocardium and an element of the analysis target fluid, the status variable represents "4".

FIG. 16 is a truth table indicating the status variables. The following description assumes that "P" represents a point before time evolution, which always exists in the fluid, and "Q" represents the destination point of the point P after time evolution. In addition, the following description assumes that the streakline calculation unit 130 performs determination only on the point Q. The streakline calculation unit 130 is able to set the status variable of the point Q by performing two kinds of determination processing.

The first determination processing is fluid determination in which the streakline calculation unit 130 determines whether the destination point Q exists in the fluid. If the point Q exists in the fluid, T is determined. If not, F is determined.

The second determination is line determination in which the streakline calculation unit 130 determines whether a line PQ formed by connecting the initial point P and the destination point Q crosses the myocardium or a surface thereof. If the line PQ crosses the myocardium (surface), T is determined. If not, F is determined. In the line determination, the number of intersections is also determined.

When the point Q exists in the fluid and the line PQ does not cross the myocardium, the streakline calculation unit 130 determines normal movement and sets "0" as the status variable.

When the point Q does not exist in the fluid and the line PQ crosses the myocardium (surface), the following two cases are possible: (1) the point Q has moved over the myocardium and fallen outside the system and (2) the point Q has been embedded in the myocardium. In either case, since recalculation needs to be performed, the streakline calculation unit 130 sets "1" as the status variable.

When the point Q does not exist in the fluid and the line PQ does not cross the myocardium (surface), the streakline calculation unit 130 determines that the point Q has fallen outside the simulation system via a large artery or the like and sets "2" as the status variable.

Even when the point Q exists in the fluid, there are cases in which impossible movement such as movement from the left atrium to the right atrium is determined. In such cases, while T is determined as the fluid determination, T is also determined as the line determination, and the number of intersections is always plural. Thus, when the number of intersections is 2 or more, the streakline calculation unit 130 sets "3" as the status variable.

When T is determined as the fluid determination and as the line determination, if the number of intersections is 1, the streakline calculation unit 130 determines that the point has fallen on a boundary surface of the fluid and the myocardium. Thus, the streakline calculation unit 130 sets "4" as the status variable.

Next, a procedure of the above status determination processing will be described.

Figure 17:
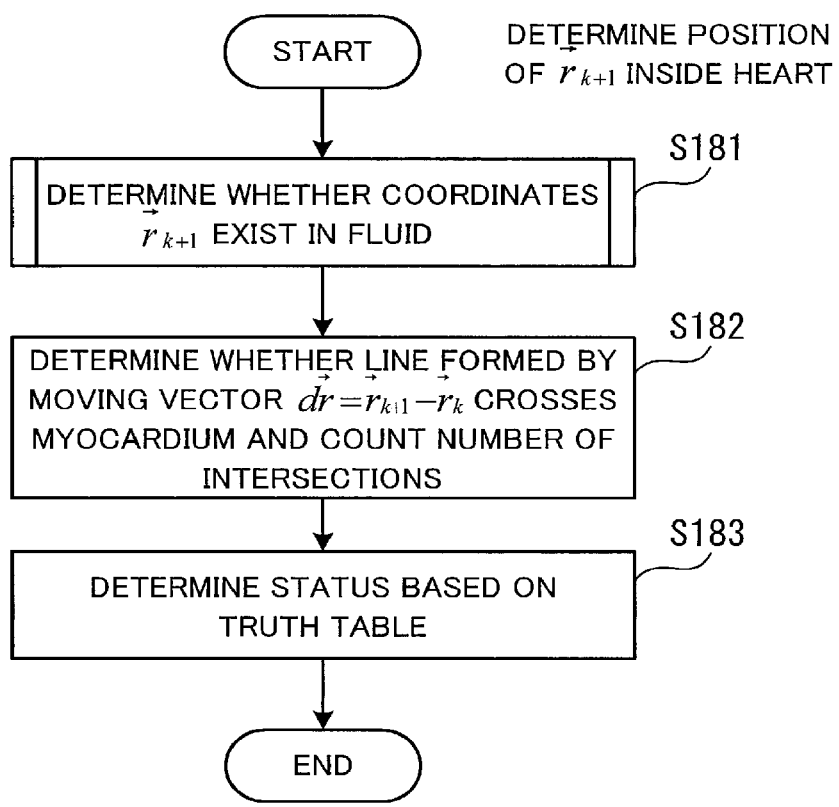
FIG. 17 is a flowchart illustrating an example of a procedure of status determination processing.

FIG. 17 is a flowchart illustrating an example of a procedure of the status determination processing. Hereinafter, the processing illustrated in FIG. 17 will be described step by step.

[Step S181] The streakline calculation unit 130 determines whether the coordinate vector $r_{k+1}$ after time evolution exists in the fluid. This processing will be described in detail with reference to FIG. 18.

[Step S182] The streakline calculation unit 130 determines whether a line having an infinite length formed by a moving vector dr=vector $r_{k+1}$−vector $r_k$ crosses the myocardium and counts the number of intersections of this line and the myocardium (surface). This processing will be described in detail with reference to FIG. 19.

[Step S183] The streakline calculation unit 130 determines the status based on the truth table illustrated in FIG. 16. Namely, each of the results of steps S181 and S182 is obtained as a truth value, i.e., true (T) or false (F). The result of step S183 is obtained as an integer of 0 or more. The streakline calculation unit 130 refers to the truth table and determines any one of the values "0" to "4" as the status variable of the heart corresponding to the return values obtained as the results of steps S181 to S183. The streakline calculation unit 130 uses the determination result as the position determination result.

In this way, the position determination is performed, and the status variable is determined.

Next, the processing (step S181) for determining whether a post-time-evolution position falls within the fluid will be described in detail.

Figure 18:
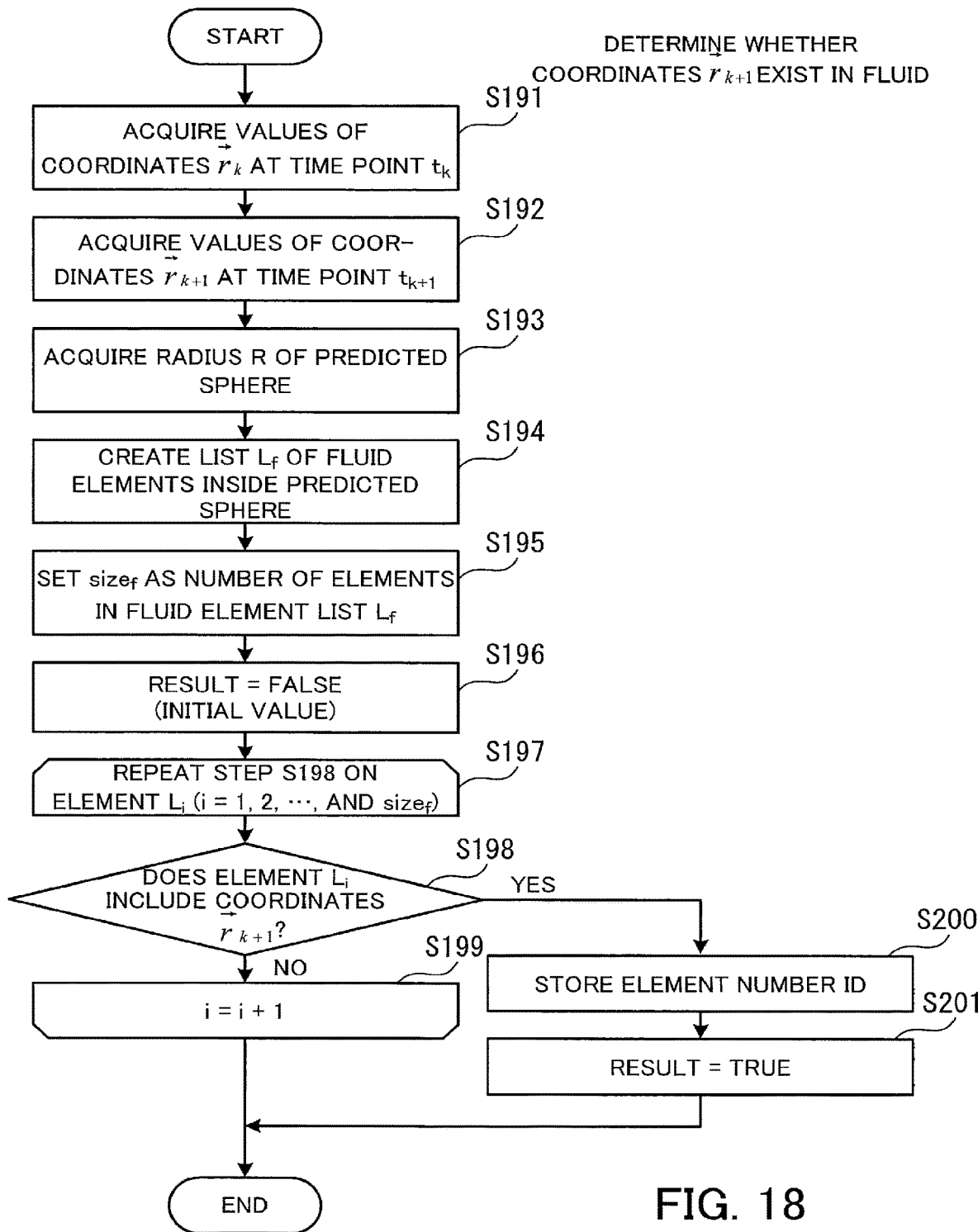
FIG. 18 is a flowchart illustrating an example of a procedure of processing for determining whether a post-time-evolution position falls within fluid.

FIG. 18 is a flowchart illustrating an example of a procedure of the processing for determining whether a post-time-evolution position falls within the fluid. In the example in FIG. 18, the streakline calculation unit 130 determines whether the coordinate vector $r_{k+1}$ exists in the fluid. Hereinafter, the processing illustrated in FIG. 18 will be described step by step.

[Step S191] The streakline calculation unit 130 acquires the coordinate vector $r_k$ at the time point $t_k$.

[Step S192] The streakline calculation unit 130 acquires the coordinate vector $r_{k+1}$ at the time point $t_{k+1}$.

[Step S193] The streakline calculation unit 130 acquires the radius R of the predicted sphere.

[Step S194] The streakline calculation unit 130 acquires a list (fluid element list $L_f$) of elements inside the predicted sphere having the coordinate vector $r_k$ as its center and having the radius R.

[Step S195] The streakline calculation unit 130 sets $size_f$ as the number of elements in the fluid element list $L_f$.

[Step S196] The streakline calculation unit 130 sets "F (False)" as the initial value of the result.

[Step S197] The streakline calculation unit 130 repeats step S198 on an individual element $L_i$ in the element list (i=1, 2, . . . , and $size_f$).

[Step S198] The streakline calculation unit 130 determines whether the element $L_i$ in the element list includes the coordinate vector $r_{k+1}$. If so, the processing proceeds to step S200. If not, the streakline calculation unit 130 proceeds to step S199.

[Step S199] Each time the streakline calculation unit 130 performs step S198, the streakline calculation unit 130 adds 1 to the index i and repeats step S198. When the streakline calculation unit 130 completes the processing on i=$size_f$, the streakline calculation unit 130 ends the processing for determining whether the post-time-evolution position falls within the fluid.

[Step S200] The streakline calculation unit 130 stores an element number ID of the element $L_i$ in a memory.

[Step S201] The streakline calculation unit 130 changes the result to "T (True)".

In this way, when the coordinates of the destination point are included in any of the elements, the streakline calculation unit 130 determines that the coordinate vector $r_{k+1}$ exists in the fluid and sets the return value to T (True). However, when the coordinates of the destination point are not included, the streakline calculation unit 130 sets the return value to F (False).

Next, the processing (step S182) for searching for an elastic body element through which a moving vector dr in the predicted sphere passes will be described in detail.

Figure 19:
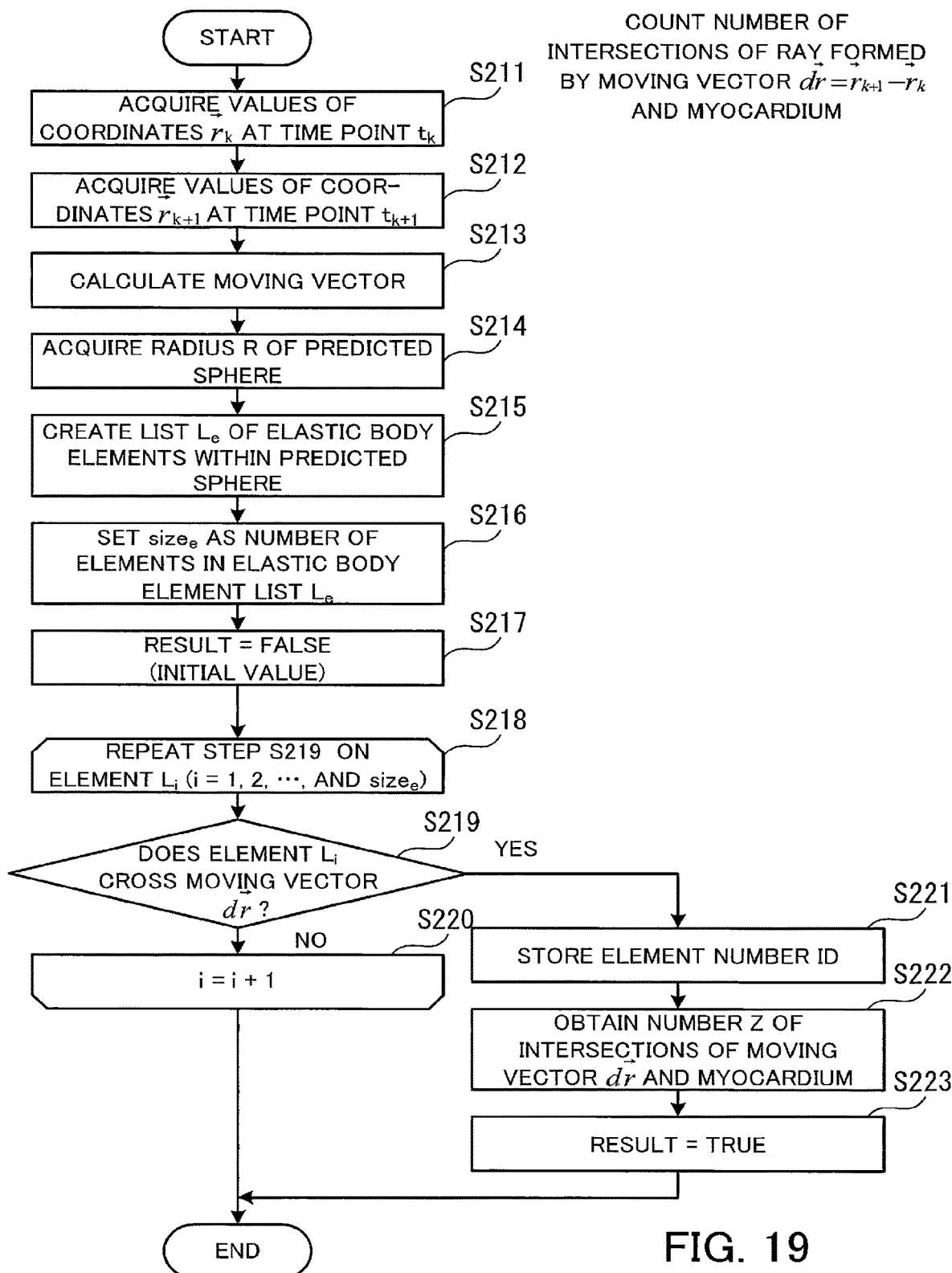
FIG. 19 is a flowchart illustrating an example of a procedure of processing for searching for an elastic body element through which a moving vector dr passes.

FIG. 19 is a flowchart illustrating an example of a procedure of the processing for searching for an elastic body element through which a moving vector dr passes. Hereinafter, the processing illustrated in FIG. 19 will be described step by step.

[Step S211] The streakline calculation unit 130 acquires the coordinate vector $r_k$ at the time point $t_k$.

[Step S212] The streakline calculation unit 130 acquires the coordinate vector $r_{k+1}$ at the time point $t_{k+1}$.

[Step S213] The streakline calculation unit 130 calculates a moving vector dr=vector $r_{k+1}$−vector $r_k$ from the acquired information. In this way, the line indicating the movement path of the point is defined.

[Step S214] The streakline calculation unit 130 acquires the radius R of the predicted sphere.

[Step S215] The streakline calculation unit 130 creates a list $L_e$ of elastic body elements within the radius of the predicted sphere.

[Step S216] The streakline calculation unit 130 sets size$_e$ as the number of elements in the elastic body element list $L_e$.

[Step S217] The streakline calculation unit 130 sets "F (False)" as the initial value of the result.

[Step S218] The streakline calculation unit 130 repeats step S219 on an individual element $L_i$ in the element list (i=1, 2, . . . , and size$_e$).

[Step S219] The streakline calculation unit 130 determines whether the i-th element $L_i$ crosses the moving vector dr. Since the element $L_i$ is a polyhedron, the streakline calculation unit 130 determines whether the moving vector dr crosses any of the surfaces of the element $L_i$. If the streakline calculation unit 130 determines no intersection on any of the surfaces of the element $L_i$, the streakline calculation unit 130 determines that the moving vector dr does not cross the element. In this case, the processing proceeds to step S220. If the streakline calculation unit 130 determines that the moving vector dr crosses the element, the processing proceeds to step S221.

[Step S220] Each time the streakline calculation unit 130 performs step S219, the streakline calculation unit 130 adds 1 to the index i and repeats step S219. When the streakline calculation unit 130 completes the processing on i=size$_e$, the streakline calculation unit 130 ends the processing for searching for an elastic body element through which the moving vector dr passes.

[Step S221] The streakline calculation unit 130 stores an element number ID of the element $L_i$ in a memory.

[Step S222] The streakline calculation unit 130 obtains the number Z (Z is an integer of 1 or more) of intersections of the moving vector dr indicating a line and the myocardial surface and stores the number Z in the memory 102.

[Step S223] The streakline calculation unit 130 changes the result to True.

As described above, when there is no intersection, the streakline calculation unit 130 determines that the moving vector dr does not cross the element and sets the return value to F. By contrast, when there is at least one intersection, the streakline calculation unit 130 determines that the moving vector dr crosses the element and sets the return value to T. In this case, the element number of the element having at least one intersection with the moving vector dr and the number Z of intersections with the myocardial surface are stored.

By performing the above processing, the streakline calculation unit 130 is able to appropriately determine the status of the destination of the point. When the streakline calculation unit 130 determines the destination in this processing, by examining the elements in the predicted sphere, the streakline calculation unit 130 is able to perform the processing more efficiently. Next, a method for setting the radius R of the predicted sphere will be described in detail.

The streakline calculation unit 130 sets the predicted sphere based on how long the coordinate vector $r_k$ before time evolution is able to move within the time step $\Delta t$. In the case of the four-order Runge-Kutta method, the following inequality is established from expression (2).

$$|\vec{r}_{i+1} - \vec{r}_i| = \left|\frac{\Delta t}{6}(\vec{v}_1 + 2\vec{v}_2 + 2\vec{v}_3 + \vec{v}_4)\right| \leq \qquad (23)$$

$$\left|\frac{\Delta t}{6}(\vec{v}_{max} + 2\vec{v}_{max} + 2\vec{v}_{max} + \vec{v}_{max})\right| \leq |\Delta t \vec{v}_{max}|$$

Thus, by defining the radius R as indicated by expression (24), the radius R represents the maximum distance that the point P on the streakline moves within the time step $\Delta t$.

$$R = |\Delta t \vec{v}_{max}| \qquad (24)$$

In addition, the point P certainly exists inside the sphere after the time step $\Delta t$. In addition, the intermediate vector $v_i$ is also a point that exists inside the sphere having the radius R, which will be indicated as follows. Namely, expression (25) is established from expressions (4) and (5).

$$|\vec{r}_{i+1} - \vec{r}_i| = \left|\frac{\Delta t}{2}\vec{v}_1\right| \leq \left|\frac{\Delta t}{2}\vec{v}_{max}\right| \leq |\Delta t \vec{v}_{max}| \qquad (25)$$

Thus, coordinates indicated by the intermediate vector represent a point inside the sphere having the radius R. By performing the same operation with the expressions (3) and (6), it is seen that all the intermediate vectors $v_i$ are also points inside the sphere having the radius R. This radius R is set as the radius of the predicted sphere. The streakline calculation unit 130 calculates the maximum value from the velocity field of the fluid for which the predicted sphere radius is set. Simply, the maximum value may be obtained from the grid points in the entire region on which the simulation is performed. Alternatively, after dividing the simulation target region into several appropriate regions, the maximum value may be obtained from the local information.

Since the maximum value of the velocity does not fall on the boundary surface S(t) from the viewpoint of the Navier-Stokes equation, the maximum value of the velocity at an intermediate time point is interpolated by expression (9). Since expression (9) is a second-order equation with respect to time, the maximum value of the velocity is calculated from the maximum value of the parabola passing through the two points at the two time points t=$t_i$ and t=$t_{i+1}$, the data of the two points having already been outputted. Approximately, because of the Talyor expansion, the second-order term in expression (9) becomes a second-order minute amount. Thus, only the first-order term may be considered, and the maximum values of the velocity fields at the respective time points $t=t_i$ and $t=t_{i+1}$ may be compared with each other. In this case, the larger maximum value is used as the maximum value of the velocity field. Thus, the streakline calculation unit 130 sets the point having the maximum norm of the calculated velocity field as the maximum velocity |vector $v_{max}$|. Next, when the time step $\Delta t$ of the Runge-Kutta method is set, the maximum moving distance is set as $R=|\Delta t v_{max}|$.

However, if the time step $\Delta t$ is too small, the predicted sphere radius R set as described above becomes smaller than the grid width (distance between neighboring grid points). Thus, there is a minimum value $R_{min}$ in discretization of grid points. For example, the initial value of this minimum value $R_{min}$ is set to 0.001 [m] as an empirical minimum value. The minimum value may be calculated from a statistical analysis of grids.

Figure 20:
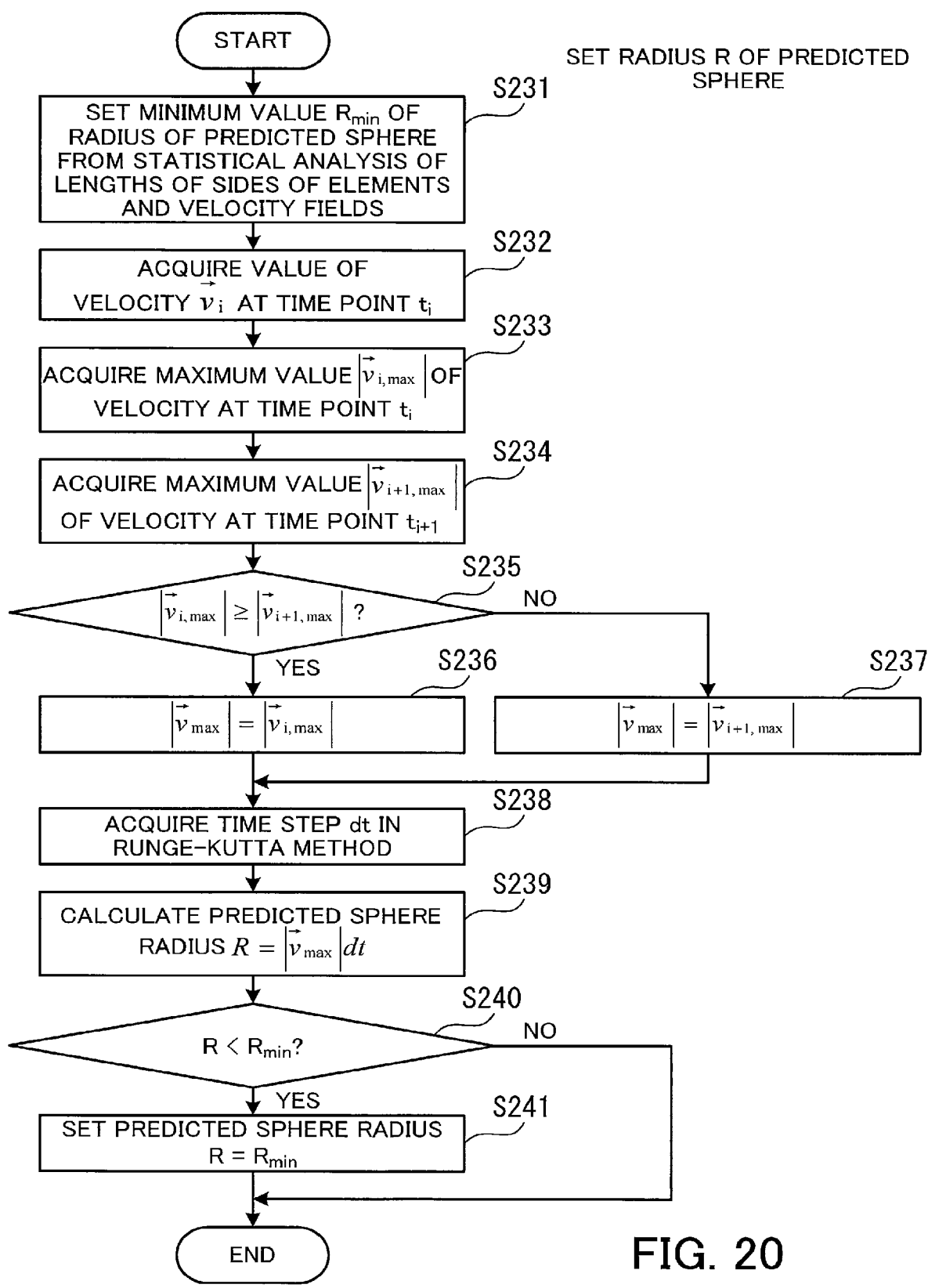
FIG. 20 is a flowchart illustrating an example of a procedure of processing for setting the radius of a predicted sphere.

When the radius R of the predicted sphere becomes smaller than the calculated $R_{min}$, the radius R of the predicted sphere is set to $R_{min}$. In this way, a situation where no element exists inside the predicted sphere is avoided. FIG. 20 illustrates a procedure of processing for setting the predicted sphere radius R as described above.

FIG. 20 is a flowchart illustrating an example of a procedure of processing for setting the predicted sphere radius. Hereinafter, the processing illustrated in FIG. 20 will be described step by step.

[Step S231] The streakline calculation unit 130 sets the minimum value $R_{min}$ of the radius of the predicted sphere from a statistical analysis of the velocity fields and the lengths of sides of elements.

[Step S232] The streakline calculation unit 130 acquires a value of a velocity vector $v_i$ at the time point $t_i$.

[Step S233] The streakline calculation unit 130 acquires a maximum value |vector $v_{i,max}$| of the velocity at the time point $t_i$.

[Step S234] The streakline calculation unit 130 acquires a maximum value |vector $v_{i+1,max}$| of the velocity at the time point $t_{i+1}$.

[Step S235] The streakline calculation unit 130 determines whether |vector $v_{i,max}$| is equal to or more than |vector $v_{i+1,max}$|. When |vector $v_{i,max}$| is equal to or more than |vector $v_{i+1,max}$|, the processing proceeds to step S236. When |vector $v_{i,max}$| is less than |vector $v_{i+1,max}$|, the processing proceeds to step S237.

[Step S236] The streakline calculation unit 130 sets |vector $v_{i,max}$| to |vector $v_{max}$|. Next, the processing proceeds to step S238.

[Step S237] The streakline calculation unit 130 sets |vector $v_{i+1,max}$| to |vector $v_{max}$||. Next, the processing proceeds to step S238.

[Step S238] The streakline calculation unit 130 acquires a time step dt in the Runge-Kutta method.

[Step S239] The streakline calculation unit 130 calculates |vector $v_{max}$|dt and sets the calculation result as the predicted sphere radius R.

[Step S240] The streakline calculation unit 130 determines whether the predicted sphere radius R is smaller than the minimum value $R_{min}$ of the predicted sphere radius. When the predicted sphere radius R is smaller than the minimum value $R_{min}$, the processing proceeds to step S241. When the predicted sphere radius R is equal to or more than the minimum value $R_{min}$ the streakline calculation unit 130 ends the present processing.

[Step S241] The streakline calculation unit 130 sets the minimum value $R_{min}$ as the predicted sphere radius R. Next, the streakline calculation unit 130 ends the present processing.

By performing the above processing, the streakline calculation unit 130 is able to set an appropriate radius R for the predicted sphere.

In the second embodiment, the processing may be performed more quickly by performing the following processing.

[Improvement in Calculation Accuracy and Speed by Division Method]

In step S127 in FIG. 9, the time section $t_i \leq t \leq t_{i+1}$ at which output files are given is divided into $N_{div}$ time points. How the time section is divided will be described in detail.

In streakline calculation, of all the elements, only a small number of elements relate to the points on a single streakline. Thus, for reduction of the storage capacity and the calculation time, a predicted sphere is used. The calculation cost of a streakline increases in proportion to the radius $R^3$ of the predicted sphere. This will be explained as follows.

The number $N_{elem}$ of elements as the calculation targets is given by the following expression, assuming that the density of the spatial element number is $\rho$ (vector r) as a function of a coordinate vector r.

$$N_{elem} = \frac{4\pi}{3}\rho(\vec{r})R^3 \tag{26}$$

Assuming that the density $\rho$ (vector r) is approximately uniform, $\rho$ (vector r)=$\rho_0$. Thus, $N_{elem} \propto R^3$.

Figure 21:
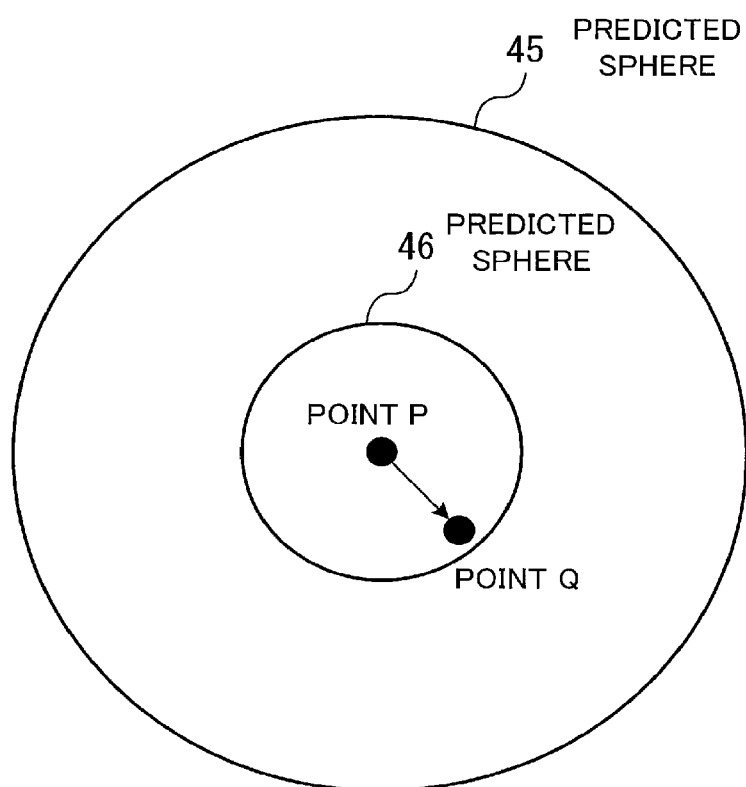
FIG. 21 illustrates a concept of reduction of the calculation amount achieved by time division.

When the time section $t_i \leq t \leq t_{i+1}$ is divided into $N_{div}$ time points, the number of time evolutions based on the Fourth-order Runge-Kutta method is $N_{div}$. Meanwhile, the predicted sphere radius is determined by expression (24). Thus, when the time step is $1/N_{div}$, the predicted sphere radius becomes also $1/N_{div}$. Since a single calculation amount is in proportion to the radius $R^3$ of the predicted sphere, the calculation amount is expressed by $N_{div}^{-3}$. Since this calculation is repeated $N_{div}$ times, the total calculation amount is expressed by $N_{div}^{-2}$. FIG. 21 schematically illustrates a concept of this calculation.

FIG. 21 illustrates a concept of reduction of the calculation amount achieved by time division. FIG. 21 assumes a case in which, a point Q, which is the destination of a point P, is calculated. When time division is not performed and a long time step is used, a large predicted sphere 45 having the point P as its center is analyzed. However, when time division is performed and a short time step is used, since the movable range of the particle at the point P is reduced, a predicted sphere 46 smaller than the predicted sphere 45 is analyzed. Namely, rather than performing a single calculation on the large predicted sphere 45, the streakline calculation unit 130 obtains the smaller predicted sphere 46 by dividing the time section into $N_{div}$ time points and obtaining segmented paths. As a result, the number of elements as the calculation targets is reduced, and the calculation amount is reduced.

Figure 22:
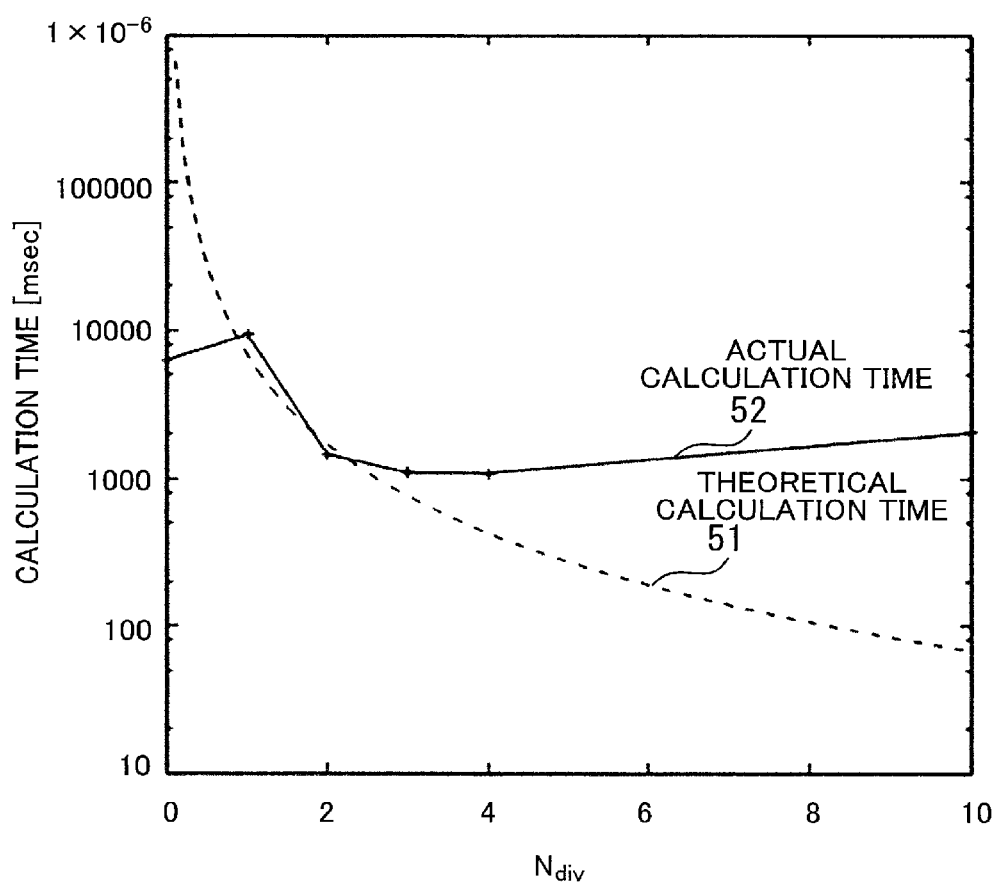
FIG. 22 illustrates an example of change of the total calculation time in accordance with the time division number.

FIG. 22 illustrates an example of change of the total calculation time in accordance with the time division number. In the graph in FIG. 22, the horizontal axis represents the division number $N_{div}$, and the vertical axis is the calculation time. In FIG. 22, a dashed line denotes transition of theoretical calculation time 51, and a solid line denotes transition of actual calculation time 52. The actual calculation time 52 is a measurement result of the total calculation time in the time section $t_i \le t \le t_{i+1}$. When $N_{div}=0$, a predicted sphere is not used, and all the elements are used as the calculation targets.

Theoretically, the larger the division number $N_{div}$ is, the shorter the calculation time will be. However, in practice, if the division number is too large, the number of times of processing performed per post-division unit time is increased, such as creation of a list of elements in the predicted sphere. Consequently, the processing time is increased. Thus, there is an optimum value as the division number $N_{div}$. For example, the streakline calculation unit 130 measures the optimum value as the division number $N_{div}$ in advance with respect to the target system while changing the division number $N_{div}$ before starting the calculation of a streakline.

[Determination Method of Minimum Value of Predicted Sphere Radius by Statistical Analysis]

A fluid simulation is performed by using a finite number of items of discrete point information. Thus, if an excessively small predicted sphere radius is set, no item of discrete point information could be included in the predicted sphere. This signifies that there is a lower limit as the predicted sphere radius. Simultaneously, since the predicted sphere radius is set by expression (24), there is a lower limit as the time step. When calculation is performed by using a predicted sphere, the lower limit $R_{min}$ as the predicted sphere radius is set. When the predicted sphere radius is equal to or less than the lower limit, the lower limit $R_{min}$ is set as the predicted sphere radius. When the predicted sphere radius is equal to or less than the lower limit, since $R_{min}$ larger than the predicted sphere radius is used, the point on the streakline does not fall outside the predicted sphere. Thus, to stably proceed with the calculation, setting the lower limit $R_{min}$ is important. In addition, the value of the lower limit $R_{min}$ relates to the setting of the time division number $N_{div}$. Since $R_0 = |\Delta t \text{ vector } v_{max}|$ is the maximum moving distance, when the value of the lower limit $R_{min}$ is determined, the division number $N_{div}$ is set from the following expression by using a ceiling function.

$$N_{div} = \left\lceil \frac{R_0}{R_{min}} \right\rceil \quad (27)$$

Since the value of the division number $N_{div}$ relates to the calculation speed and the calculation accuracy, setting the lower limit $R_{min}$ is also important in the calculation speed and the calculation accuracy.

However, care needs to be taken in setting the lower limit $R_{min}$. Specifically, a probability model is introduced, and the streakline calculation unit 130 performs speculative calculation that allows calculation failure. When calculation fails, the streakline calculation unit 130 performs calculation by using parameters with which the calculation certainly succeeds. The time needed for this recalculation is considered as a penalty. The lower limit $R_{min}$ that statistically minimizes the calculation time including the penalty is set. Next, how the lower limit $R_{min}$ is set will be described in detail.

First, the streakline calculation unit 130 sets a radius $R_w$ as the worst value used as the penalty. The longest length of a side of an element used in the simulation is used as the radius $R_w$.

Figure 23:
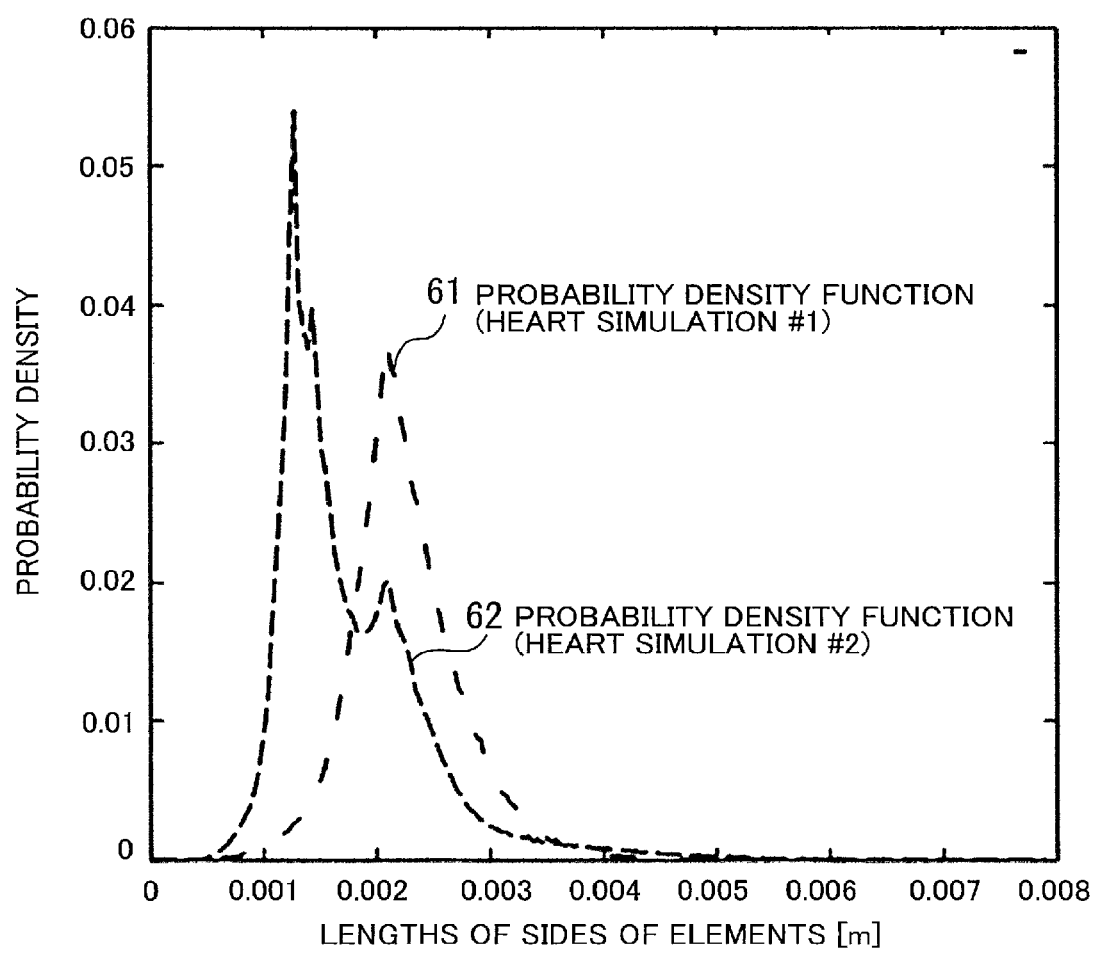
FIG. 23 illustrates an example of a distribution of lengths of sides of elements.

FIG. 23 illustrates an example of distribution of a length of a side of an element. In the graph in FIG. 23, the horizontal axis represents a length of a side of an element, and the vertical axis represents the probability density indicating each of the lengths of sides. In the graph, probability density functions 61 and of two kinds of heart simulations #1 and #2 are represented by dashed lines.

In the example in FIG. 23, some of the elements used in the simulations are very rough, and the longest side is 0.008 [m]. Thus, if these elements are directly used for calculation, the division number $N_{div}$ is also decreased, and the speed is also decreased. However, most calculation may be performed without using the longest side.

After the radius $R_w$ as the worst value is set, the streakline calculation unit 130 sets the lower limit $R_{min}$ used for calculation. In this operation, the streakline calculation unit 130 calculates the statistical calculation cost while assuming failure of the calculation. In addition, in view of execution of speculative calculation, the streakline calculation unit 130 selects, as the lower limit $R_{min}$, a radius that minimizes the calculation amount including a penalty that occurs when the calculation fails. While this significantly depends on a probability model assumed, the speculative calculation will be described by using a simple example. First, the calculation using a point on a streakline assumes that all the elements could be analysis targets with equal probability. In this case, the calculation succeeds in accordance with the probability density functions 61 and 62 in FIG. 23.

The following description assumes that the calculation time is T when the radius is R. In this case, the corresponding calculation amount is in proportion to $R^3$. In addition, the following description assumes that the calculation succeeds with the probability p[%] by reducing the radius to $\beta R$ ($0 < \beta \le 1$). A case in which the calculation succeeds is a case in which the destination of the point falls inside the predicted sphere having the radius $\beta R$. When the calculation fails, recalculation is performed by using the radius R. In this case, calculation time T' including the penalty is expressed by expression (28)

$$\frac{T'}{T} = 1 - \int_0^{\beta R} p(L) dL + \beta^3 \quad (28)$$

Figure 24:
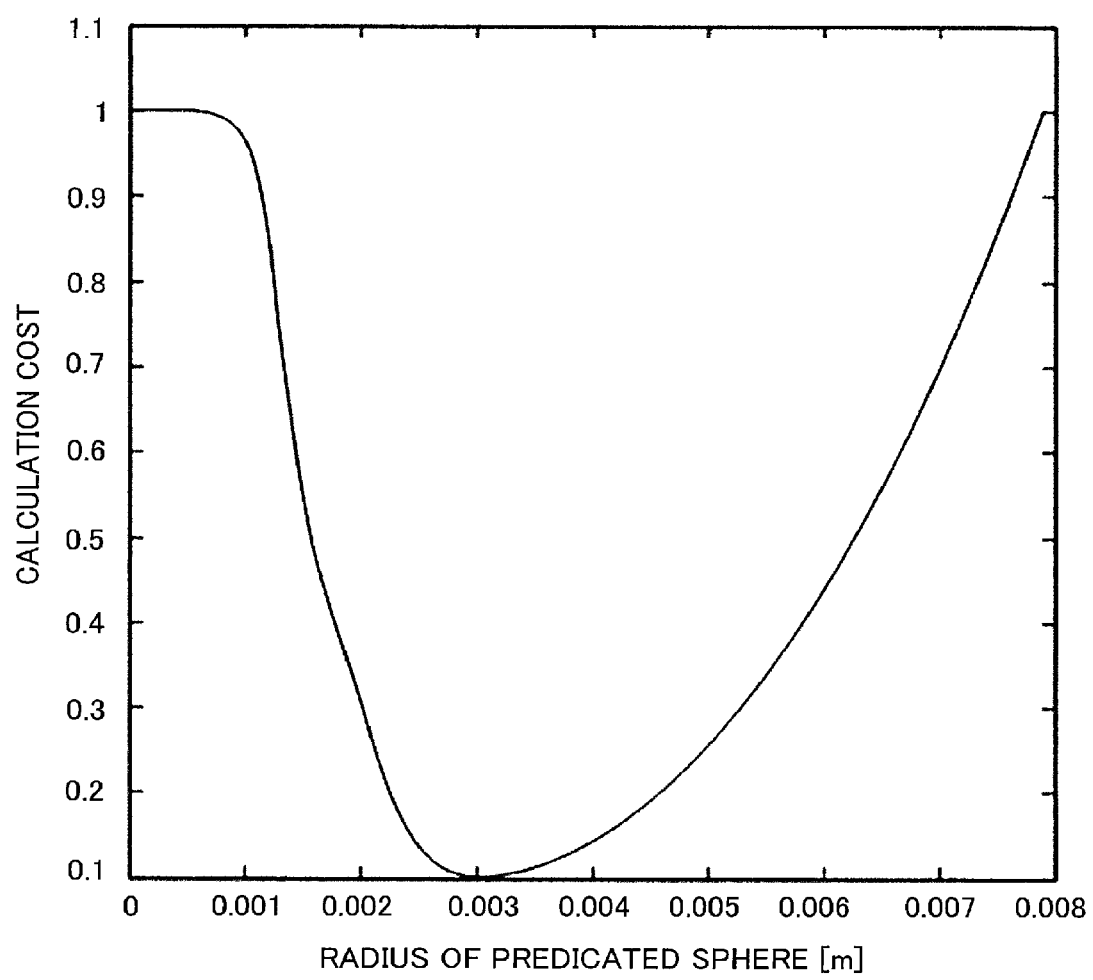
FIG. 24 illustrates change of the calculation cost based on the predicted sphere radius.

FIG. 24 illustrates change of the calculation cost based on the predicted sphere radius. In FIG. 24, the vertical axis represents the calculation cost (T'/T), and the horizontal axis represents the predicted sphere radius R. As illustrated in FIG. 24, it is seen that the cost including the penalty when the predicted sphere radius R is about 0.003 [m] is less than the cost including the penalty when the predicted sphere radius is the worst value radius $R_{max}$ (0.008 [m]) approximately by 10%. Namely, it is seen that there is a radius that achieves a statistically minimum calculation amount including the penalty. In practice, since a finite number of times of calculation is performed, all the elements are not used as the analysis targets with the equal probability. Thus, a smaller value than the above value is used as the radius.

In this case, while it is possible to indicate that there is an optimum predicted sphere radius R, the optimum value itself tends to be overestimated. Thus, to prevent such an overestimate, a distribution of moving distances as illustrated in FIG. 25 may be obtained by obtaining the norm of the velocity field at an individual discrete point and multiplying the time step by the norm.

Figure 25:
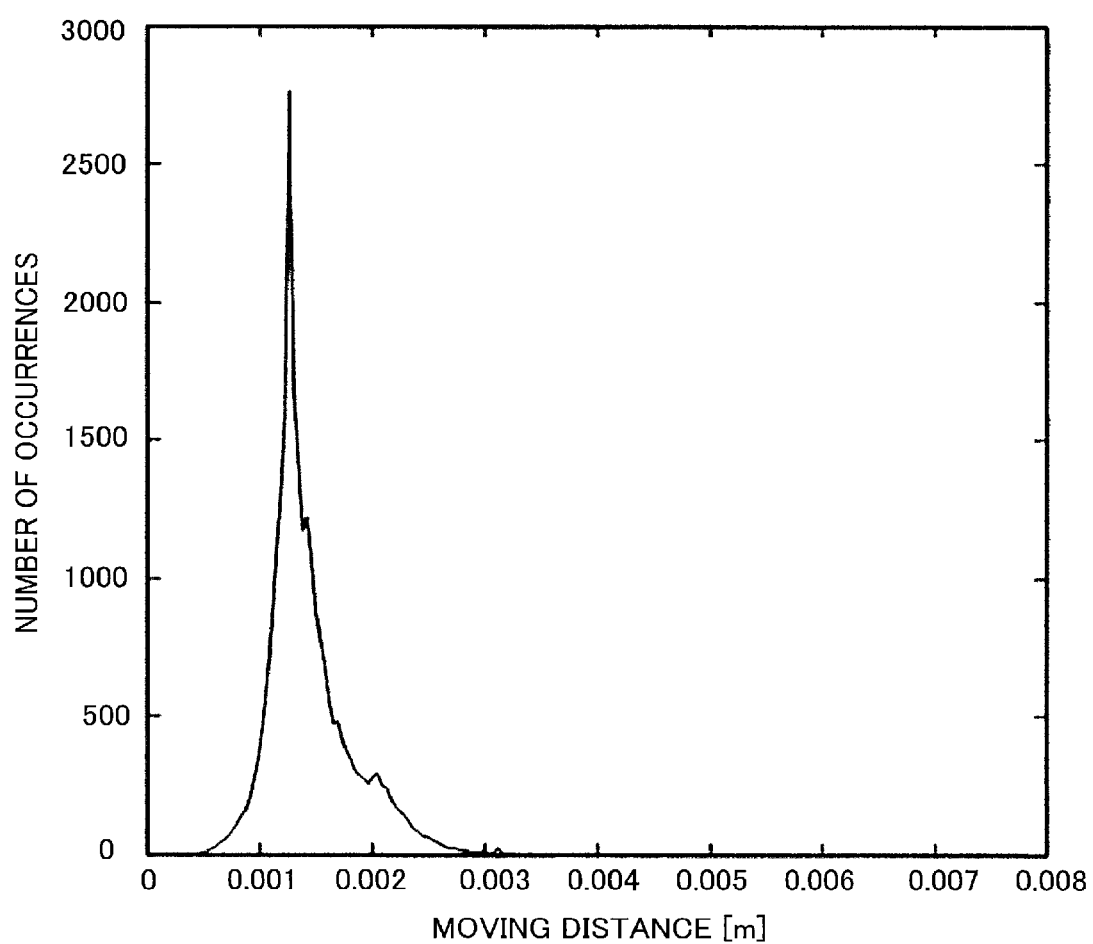
FIG. 25 illustrates a probability distribution of moving distances.
Figure 26:
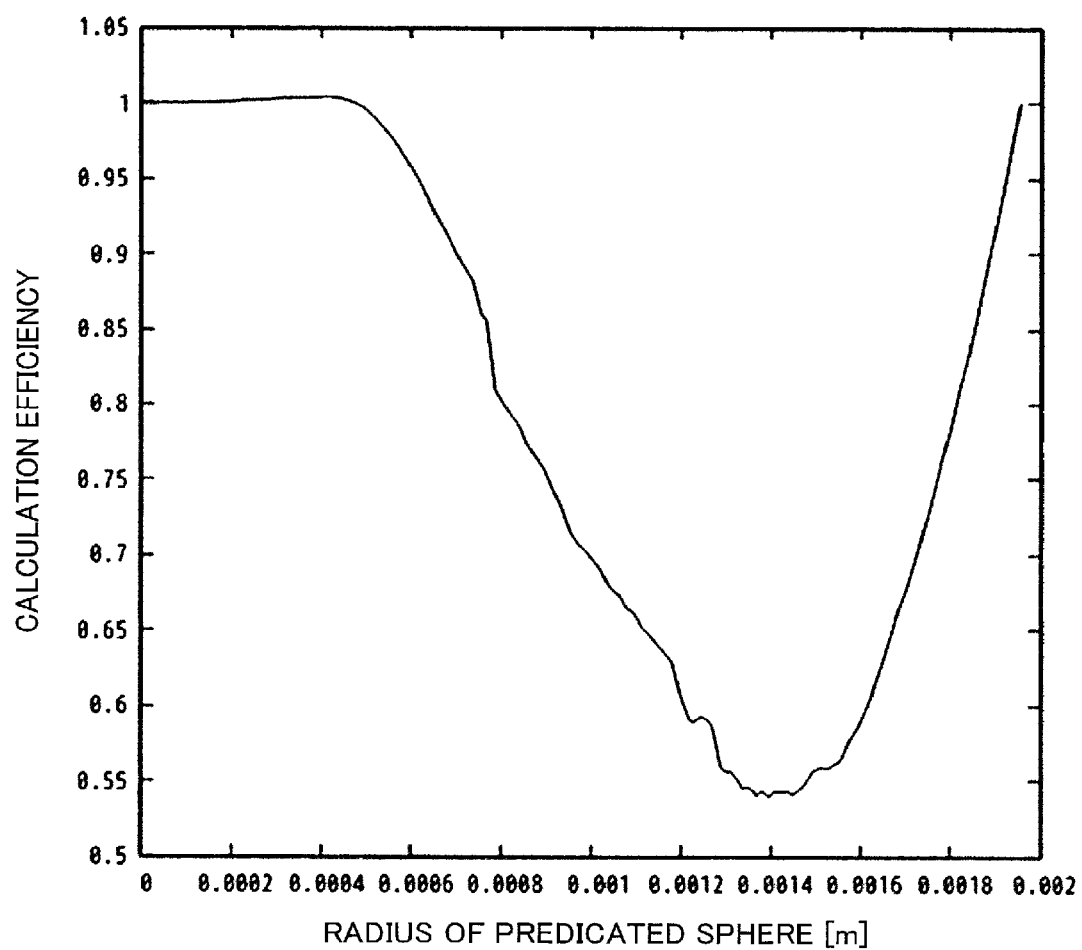
FIG. 26 illustrates a calculation efficiency curve when a probability distribution is assumed.

FIG. 25 illustrates a probability distribution of moving distances. In FIG. 25, the horizontal axis represents the moving distance, and the vertical axis represents the number of occurrences. Even when there are two tetrahedrons having the same shape and size, if the magnitude of the velocity field on one tetrahedron is twice as large as that on the other tetrahedron, the time needed for a point to pass through the target tetrahedron is reduced by half. FIG. 26 illustrates calculation efficiency including the penalty as a function of the predicted sphere radius R by using expression (28) based on the distribution of moving distances.

FIG. 26 illustrates a calculation efficiency curve when a probability distribution is assumed. In FIG. 26, the horizontal axis represents the predicted sphere radius R, and the vertical axis represents the calculation efficiency. A smaller calculation efficiency value indicates better efficiency. From FIG. 26, the best calculation efficiency corresponds to the predicted sphere radius R in the range of approximately from 0.0012 [m] to 0.0016 [m]. This is a model supporting that the empirical best value $R_{min}$=0.0015±0.0005 [m].

In this way, the best value of the predicted sphere radius R is obtained. Namely, while the streakline calculation unit 130 needs to perform recalculation as a penalty when a discrete point falls outside the predicted sphere, the streakline calculation unit 130 is able to set the most efficient radius R of the predicted sphere in view of this penalty. As a result, the efficiency of the streakline calculation is improved.

Specific Calculation Example

Hereinafter, the calculation speed measured when a streakline is actually calculated by causing the heart simulator to analyze the myocardium and coronary circulation will specifically be described.

First, data used in the calculation will be described. A simulation result corresponding to a single heartbeat was outputted, and 100 heart state data was outputted per 0.01 [sec]. Since the heart pulsates, the velocity field changes over time. Thus, the velocity field is an unsteady flow. In addition, the myocardium repeats relaxation and contraction because of the pulsation. Thus, the myocardial surfaces also move, resulting in a moving boundary problem. To describe transfer of the blood flow in the heart in this system, particle generation sources were arranged at a plurality of points in the heart, and streaklines were calculated.

When the visualization apparatus 100 read information about the myocardium and the fluid from the outside, the number M of streaklines and the number N of times of calculation were inputted to the visualization apparatus 100. In addition, the positions of the streakline generation sources were inputted to the visualization apparatus 100. The streakline generation sources were arranged in the left ventricle and the right atrium in the heart. In accordance with the instruction of the arrangement of the streakline generation sources, for example, the visualization apparatus 100 randomly arranged streakline generation sources in the individual fluid portion inside the sphere having a radius of 0.05 [m]. In addition, the number of times of calculation was set to 30, which corresponded to 0.3 heartbeat. The time evolution calculation was performed by using the fourth-order Runge-Kutta method.

After setting the above initial conditions, when the visualization apparatus 100 started streakline calculation, particles were generated from the particle generation sources per step. The position of an individual particle after the time step Δt=0.01 [sec] was calculated in accordance with the streakline calculation flowchart illustrated in FIG. 8. The streaklines calculated were displayed on the monitor 21.

Figure 27:
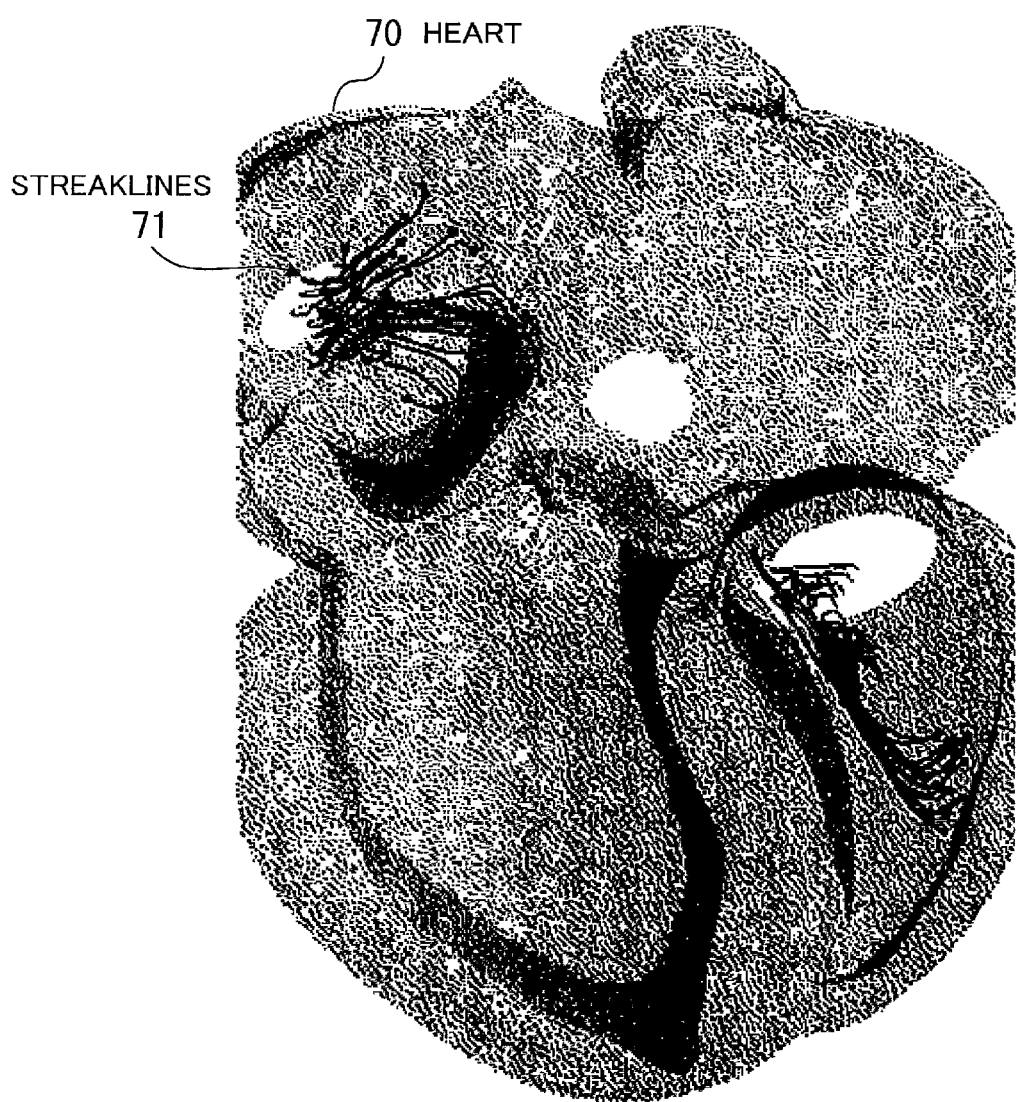
FIG. 27 illustrates an example of display of streaklines.

FIG. 27 illustrates an example of display of streaklines. In the example in FIG. 27, a plurality of streaklines 71 are superimposed on a sectional image of a heart 70.

When calculating streaklines, the streakline calculation unit 130 uses a predicted sphere to reduce the calculation amount and improve the calculation accuracy. In the calculation using a predicted sphere, the time step Δt=0.01 [sec] was further divided by the division number $N_{div}$. As the division number $N_{div}$, an optimum value that would achieve a statistically minimum calculation amount was automatically set. In this simulation, the division number $N_{div}$ was set to approximately 3 to 7.

The calculation speed was quantitatively measured through optimization by using the division number $N_{div}$, and FIG. 22 illustrates a result of the measurement. The example in FIG. 22 also illustrates the calculation time of a streakline when no predicted sphere was used, so as to clarify the advantageous effect obtained by use of a predicted sphere. $N_{div}$=0 corresponds to the time needed when no predicted sphere was used, namely, when all the elements were used as the calculation targets.

When a predicted sphere is used ($N_{div}$=1), namely, when the time division is not performed substantially, time is needed to establish the predicted sphere. Thus, more time is needed than the case in which no predicted sphere is used (about 1.47 times). However, when $N_{div}$=2, the effect of the reduction of the calculation cost in proportion to $N_{div}^{-2}$ has more impact than the fixed cost of establishing the predicted sphere. Thus, the calculation time is reduced by about 22.9%, compared with the case in which no predicted sphere is used. While the calculation time shortens as the division number $N_{div}$ increases, it is seen that there is an upper limit in performance improvement because of the fixed cost of establishing the predicted sphere. In the example in FIG. 22, the best division number is 4. If the division number $N_{div}$ is increased further, since the effect of the fixed cost has more impact, the calculation time starts to increase. When $N_{div}$=10, the performance is deteriorated by about 53%, compared with the best case.

As described above, while there is an optimum value for the division number $N_{div}$, the best division number is set before a streakline is calculated in actual calculation. In addition, in the calculation in FIG. 22, since the number of grid points is no more than approximately 50,000, the calculation time is shorter in the case in which no predicted sphere is used than the case in which the predicted sphere is used and the division number $N_{div}$ is 1. However, if the simulation system is increased, the calculation amount of the case in which no predicted sphere is used increases in proportion to the number of grid points. For example, if the grid number is increased 10 times, the time is increased 10 times. However, when a predicted sphere is used, since the predicted sphere radius R is set only based on the maximum value of the velocity and the time step and is always constant, the calculation amount is also constant. Thus, the larger the system on which the simulation is performed is, the greater the advantageous effect obtained by use of the predicted sphere will be.

In addition, another advantageous effect, which is improvement in accuracy, obtained by the time division on a predicted sphere will be described. While expressions (2) to (6) are given in the case of the fourth-order Runge-Kutta method, it is known that the error order is given as $O(\Delta t^4)$. Thus, when the time is divided by the division number $N_{div}$, the error in a single Runge-Kutta operation results in $N_{div}^{-4}$ times. Even when calculation based on the Runge-Kutta method $N_{div}$ times in total in the time section $t_i \leq t \leq t_{i+1}$ and the error is accumulated $N_{div}$ times, the total error remains $N_{div}^{-3}$. When the division number $N_{div}$ is 4, the total error is 1/64 times.

Figure 28:
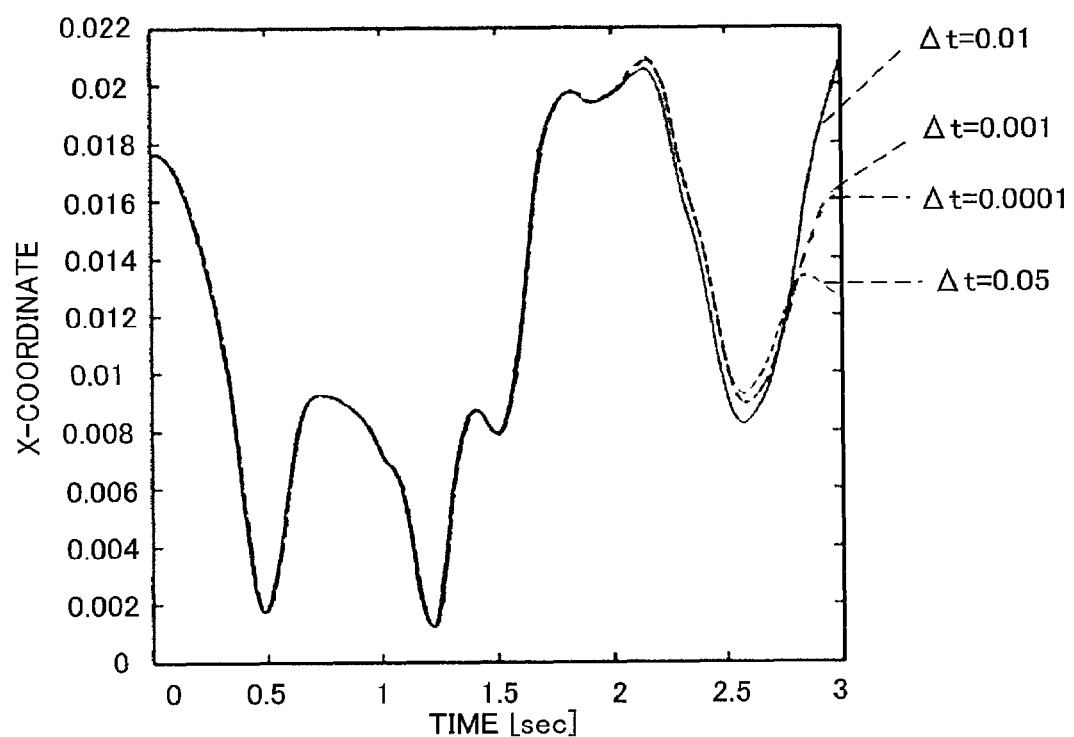
FIG. 28 illustrates change of the accuracy of a trajectory when the time step is changed.

FIG. 28 illustrates change of the accuracy of a trajectory when the time step is changed. In FIG. 28, the horizontal axis represents the simulation time, and the vertical axis represents the x coordinates of a discrete point. The example in FIG. 28 illustrates the temporal change (trajectory) of the x coordinates of a certain discrete point when the time step Δt is set to "0.01", "0.05", "0.001", and "0.0001".

When the coordinate change amount after the integration is small or when the number of integration operations is small, the trajectory does not change regardless of the time step. However, in a region (time t>2.5 [sec]) in which the number of integration operations is large, the trajectory corresponding to when the time step Δt=0.01 [sec] is significantly shifted from the trajectories corresponding to when the time step Δt=0.001 [sec] and 0.0001 [sec], respectively. However, the trajectories corresponding to when the time step Δt=0.001 [sec] and Δt=0.0001 [sec] are very close to each other. Thus, it is seen that accumulation of calculation errors is prevented by reducing the time step.

As described above, setting the division number $N_{div}$ is important in the calculation speed and the calculation accuracy. In addition, the division number $N_{div}$ is set depending on the minimum value $R_{min}$ of the predicted sphere radius. In actual calculation, a probability model is assumed in view of both the velocity field and lengths of sides of elements as illustrated in FIG. 25, and a probability distribution is calculated. In addition, from the probability distribution, the calculation efficiency is calculated by using expression (28), and the minimum value $R_{min}$ that achieves the best calculation efficiency is calculated. Namely, as illustrated in FIG. 26, there is a minimum value as the radius of the predicted sphere, and the minimum value $R_{min}$ is about 0.0015±0.0005 [m]. Thus, the calculation is always performed at the minimum calculation cost.

Other Embodiments

The points on a streakline are independent of each other without interacting with each other. Thus, since parallelization is suitably applicable, calculation of streaklines may be performed in a parallel manner by using Message Passing Interface (MPI) or Open Multi-Processing (OpenMP). In this way, the calculation speed is improved.

In addition, while an example in which streaklines of the blood flow are visualized by using results of a heart simulation has been illustrated in the second embodiment, the second embodiment is also applicable to results of other fluid simulations. For example, when a variable wing mechanism is arranged on a rear portion of an automobile, the flow of the air around the variable wing mechanism when the variable wing mechanism is activated may be simulated and analyzed. By using the visualization apparatus 100 according to the second embodiment, the flow of the air around the variable wing mechanism when the variable wing mechanism is activated is visualized by streaklines. In addition, the second embodiment is also applicable to fluid simulation results indicating the flow of the air around a swing wing of an airplane when the wing swings.

According to one aspect, streaklines are tracked even when the structure deforms.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A streakline visualization apparatus for calculating a streakline indicating a series of particles at a plurality of analysis time points in fluid simulation time and displays the streakline, the streakline visualization apparatus comprising:
   a memory configured to store structure information indicating temporal change of a shape of a structure in an analysis space and fluid information indicating at least one of spatial change and temporal change of a velocity of fluid at a plurality of points in a region where the fluid exists in the analysis space; and
   a processor coupled to the memory and configured to perform a procedure including:
   setting, when calculating a second streakline at a second analysis time point based on a first streakline at a first analysis time point, a partial region including a discrete point at a first position on the first streakline in the analysis space as an analysis target region of the discrete point,
   calculating, based on the velocity of the fluid in the analysis target region, the velocity indicated by the fluid information, a second position indicating a destination of a particle on the discrete point at the second analysis time point,
   determining, based on information about the structure in the analysis target region, the information indicated by the structure information, a region occupied by the structure in the analysis target region at the second analysis time point,
   determining entrance or non-entrance of the second streakline into the occupied region based on the first position and the second position,
   setting, when determining that the second streakline has entered the occupied region, at least a third analysis time in a time period between the first analysis time point and the second analysis time point,
   calculating a third position indicating a destination of the particle on the discrete point at a third analysis time point, and
   recalculating the second position based on the third position.

2. The streakline visualization apparatus according to claim 1, wherein the setting of the analysis target region includes calculating a maximum velocity of the fluid in a time period between the first analysis time point and the second analysis time point and calculating a radius of the analysis target region as a spherical region based on a difference between the first analysis time point and the second analysis time point and the maximum velocity.

3. The streakline visualization apparatus according to claim 2, wherein the setting of the analysis target region includes setting a minimum value as the radius of the analysis target region based on an interval between a plurality of points in the region where the fluid exists and setting, when the calculated radius is smaller than the minimum value, the minimum value as the radius of the analysis target region.

4. The streakline visualization apparatus according to claim 3, wherein the setting of the analysis target region includes, in a case that calculation of the second position with the set radius is not completed, recalculating the second position with a maximum radius value as the radius of the analysis target region, calculating a radius that minimizes a calculation amount including a calculation amount for the recalculation of the second position, and setting, when the calculated radius is smaller than the minimum value, the minimum value as the radius of the analysis target region.

5. The streakline visualization apparatus according to claim 2,
wherein the setting of the analysis target region includes the radius of the analysis target region that is smaller than a value calculated by multiplying the difference between the first analysis time point and the second analysis time point by the maximum velocity, and
wherein the calculating of the second position includes, when the destination of the particle on the discrete point has fallen outside the analysis target region, recalculating the second position by expanding the analysis target region.

6. The streakline visualization apparatus according to claim 1, wherein the determining of the entrance or non-entrance includes performing a first determination of whether the second position has fallen inside the fluid, performing a second determination of whether a line connecting the first position and the second position has crossed a surface of the structure, and determining whether the second streakline has entered the occupied region based on results of the first determination and the second determination.

7. The streakline visualization apparatus according to claim 1, wherein the procedure further includes, displaying, when determining that the second streakline has not entered the occupied region, the second streakline passing through the second position.

8. A streakline visualization method for calculating a streakline indicating a series of particles at a plurality of analysis time points in fluid simulation time and displaying the streakline, the streakline visualization method comprising:
setting, by a processor, when calculating a second streakline at a second analysis time point based on a first streakline at a first analysis time point, a partial region including a discrete point at a first position on the first streakline in an analysis space as an analysis target region of the discrete point;
referring to, by the processor, fluid information indicating at least one of spatial change and temporal change of a velocity of fluid at a plurality of points in a region where the fluid exists in the analysis space and calculating, based on the velocity of the fluid in the analysis target region, a second position indicating a destination of a particle on the discrete point at the second analysis time point;
referring to, by the processor, structure information indicating temporal change of a shape of a structure in the analysis space and determining, based on information about the structure in the analysis target region, a region occupied by the structure in the analysis target region at the second analysis time point;
determining, by the processor, entrance or non-entrance of the second streakline into the occupied region based on the first position and the second position;
setting, when determining that the second streakline has entered the occupied region, at least one third analysis time in a time period between the first analysis time point and the second analysis time point;
calculating a third position indicating a destination of the particle on the discrete point at the third analysis time point; and
recalculating the second position based on the third position.

9. A non-transitory computer-readable storage medium storing a computer program that causes a computer to perform a procedure including calculating a streakline indicating a series of particles at a plurality of analysis time points in fluid simulation time and displaying the streakline, the procedure comprising:
setting, when calculating a second streakline at a second analysis time point based on a first streakline at a first analysis time point, a partial region including a discrete point at a first position on the first streakline in an analysis space as an analysis target region of the discrete point;
referring to fluid information indicating at least one of spatial change and temporal change of a velocity of fluid at a plurality of points in a region where the fluid exists in the analysis space and calculating, based on the velocity of the fluid in the analysis target region, a second position indicating a destination of a particle on the discrete point at the second analysis time point;
referring to structure information indicating temporal change of a shape of a structure in the analysis space and determining, based on information about the structure in the analysis target region, a region occupied by the structure in the analysis target region at the second analysis time point;
determining entrance or non-entrance of the second streakline into the occupied region based on the first position and the second position;
setting, when determining that the second streakline has entered the occupied region, at least one third analysis time in a time period between the first analysis time point and the second analysis time point;
calculating a third position indicating a destination of the particle on the discrete point at the third analysis time point; and
recalculating the second position based on the third position.

\* \* \* \* \*